United States Patent [19]
Meinerth et al.

[11] Patent Number: 5,321,806
[45] Date of Patent: Jun. 14, 1994

[54] METHOD AND APPARATUS FOR TRANSMITTING GRAPHICS COMMAND IN A COMPUTER GRAPHICS SYSTEM

[75] Inventors: Kim Meinerth, Middleton, Mass.; Colyn Case, Amherst, N.H.; Ali Moezzi, Chelmsford, Mass.; John Irwin, Hudson, N.H.; Agnes Masucci, Haverhill; Srinivasan Krishnaswami, Shrewsbury, both of Mass.

[73] Assignee: Digital Equipment Corporation, Maynard, Mass.

[21] Appl. No.: 748,360

[22] Filed: Aug. 21, 1991

[51] Int. Cl.⁵ .............................................. G06F 15/20
[52] U.S. Cl. .................................... 395/162; 395/164
[58] Field of Search ............... 395/162, 164, 166, 375; 340/799, 798

[56] References Cited

U.S. PATENT DOCUMENTS

| | | | |
|---|---|---|---|
| 4,731,742 | 3/1988 | Nishi et al. | 395/166 |
| 4,745,407 | 5/1988 | Costella | 340/799 |
| 4,747,074 | 5/1988 | Yoshida | 364/900 |
| 4,811,281 | 3/1989 | Okamota et al. | 364/DIG. 2 |
| 4,876,663 | 10/1989 | McCord | 340/799 |
| 4,905,167 | 2/1990 | Yamaoka et al. | 358/140 |
| 4,910,683 | 3/1990 | Bishop et al. | 340/799 |
| 4,916,301 | 4/1990 | Mansfield et al. | 395/162 |
| 4,931,958 | 6/1990 | Takeda | 340/799 |
| 4,991,112 | 2/1991 | Callemyn | 395/166 |
| 5,001,653 | 3/1991 | Buchanan et al. | 395/102 |
| 5,046,023 | 9/1991 | Katsura et al. | 395/162 |

FOREIGN PATENT DOCUMENTS

0425185A2 5/1991 European Pat. Off. .

Primary Examiner—Dale M. Shaw
Assistant Examiner—Kee M. Tung
Attorney, Agent, or Firm—Clayton L. Satow; Barry N. Young; Albert P. Cefalo

[57] ABSTRACT

A residue buffer, for temporary storage of portions of transmissions from a CPU to a graphics processor. Graphics commands are transmitted, in transmission units of uniform size, from a processor unit to an address generator, which processes the commands. The portion of the transmission unit not immediately usable by the graphics processor is stored in the residue buffer. The disclosure further describes a computer graphics system, having a graphics processor capable of reading from or writing to main memory, including virtual memory, without any action by the CPU; having a duplicate cache tag store accessible by the graphics system without generating traffic on the system bus; having a FIFO command buffer in main memory for temporary storage of graphics commands; having a "short circuit" feature for routing graphics commands to the command processor in the minimum number of steps; having a cursor control system capable of storing cursor pattern information in, and retrieving cursor pattern information from, main memory; having a cursor bus that is reconfigurable to carry information other than cursor information; and having a frame buffer module that contains no timing or cursor control circuitry.

10 Claims, 21 Drawing Sheets

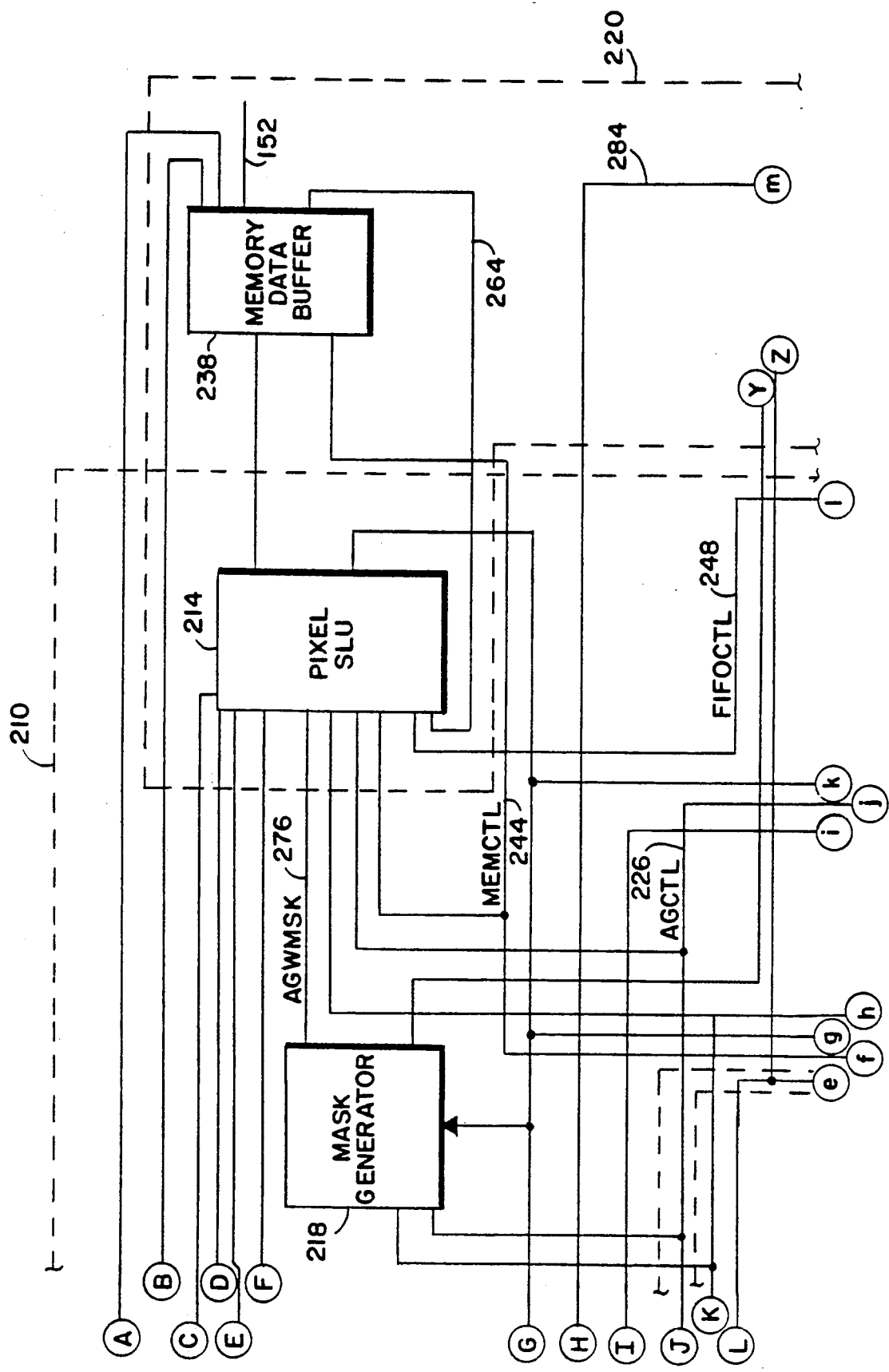

METHOD AND APPARATUS FOR TRANSMITTING GRAPHICS COMMAND IN A COMPUTER GRAPHICS SYSTEM

FIELD OF THE INVENTION

This invention relates generally to computer graphics systems, and more specifically to the transmission of graphics commands from a CPU to a graphics processor.

BACKGROUND

Computer graphics systems are special purpose computers that are used to create complex images on a display and to allow the computer user to modify and store the images.

Showing images on a display and moving the images on the display screen is a complex computer task, and there is a need in the industry for methods for more efficiently performing this complex task. In addition, as computer graphics applications become more popular, there is a need in the industry for computer graphics systems that are less expensive than current systems.

Many of the elements of a typical computer graphics system are shown in FIG. 4 of U.S. Pat. No. 4,745,407, entitled "Memory Organization Apparatus and Method", issued May 17, 1988 to Costello. A graphics accelerator is a special purpose processor unit which receives graphics commands from the CPU and executes them, typically by changing information stored in the frame buffer. A frame buffer is a special purpose type of memory in which the memory locations correspond to a location, or pixel, on a color monitor, or other type of display. Devices not shown in FIG. 4 of Costello sequentially read the memory locations in the frame buffer, and cause the pixel to be lit with the appropriate intensity or color, thereby causing the image to be shown on the display.

One method for providing a more efficient, less expensive computer graphics system is to provide more efficient means for transmitting and processing the graphics commands.

In a system such as the one taught by Costello, commands are transmitted from the CPU to the graphics accelerator over the VME bus. Unfortunately, general purpose buses such as the VME bus frequently carry a lot of traffic. This is particularly true in a system such as Costello, in which traffic between main memory and the frame buffer must travel over the same bus as traffic between the CPU and the graphics processor.

Thus it is important to maximize the efficiency of transmissions over the bus. One way of doing this is to force transmissions to be of a uniform size, typically a number of words or bytes, and to optimize the bus for transmissions of that size. However, for certain types of transmissions, it may be desirable for the information to be in sizes other than the uniform size. For example, the information being transferred may be a stream of graphics commands. If the graphics commands are all the same length, and the length is the same as the uniform transmission size, then the graphics commands may be transmitted to and from main memory efficiently. However, restricting the length of the graphics commands to the uniform transmission size may be inconvenient for the designer of the graphics command set. If the designer of the graphics command set wishes to create graphics commands of varying length, it may be very difficult for the system designer to select an optimal uniform transmission size.

SUMMARY OF THE INVENTION

The invention described herein provides a method by which graphics commands can be of varying length, and yet can be transferred in transmissions of uniform size.

According to the invention, graphics commands are transmitted, in transmission units of uniform size, from a processor unit to an address generator, which processes the commands. A residue buffer is provided so that portions of data transmission units not immediately usable by the address generator can be stored in the residue buffer.

Other objects, features and advantages of the invention will become apparent from a reading of the specification, when taken in conjunction with the drawings, in which like reference characters refer to like elements in the several views. It is to be understood that the drawings represent the interrelationships of the elements and do not necessarily represent the physical location of the elements.

BRIEF DESCRIPTION OF THE DRAWINGS

FIG. 2 comprising

FIG. 3 comprising FIGS. 3a-3d is a block diagram of the graphics/memory control unit;

FIG. 4 comprising

FIG. 6 comprising

DETAILED DESCRIPTION OF THE INVENTION

Figure 1:
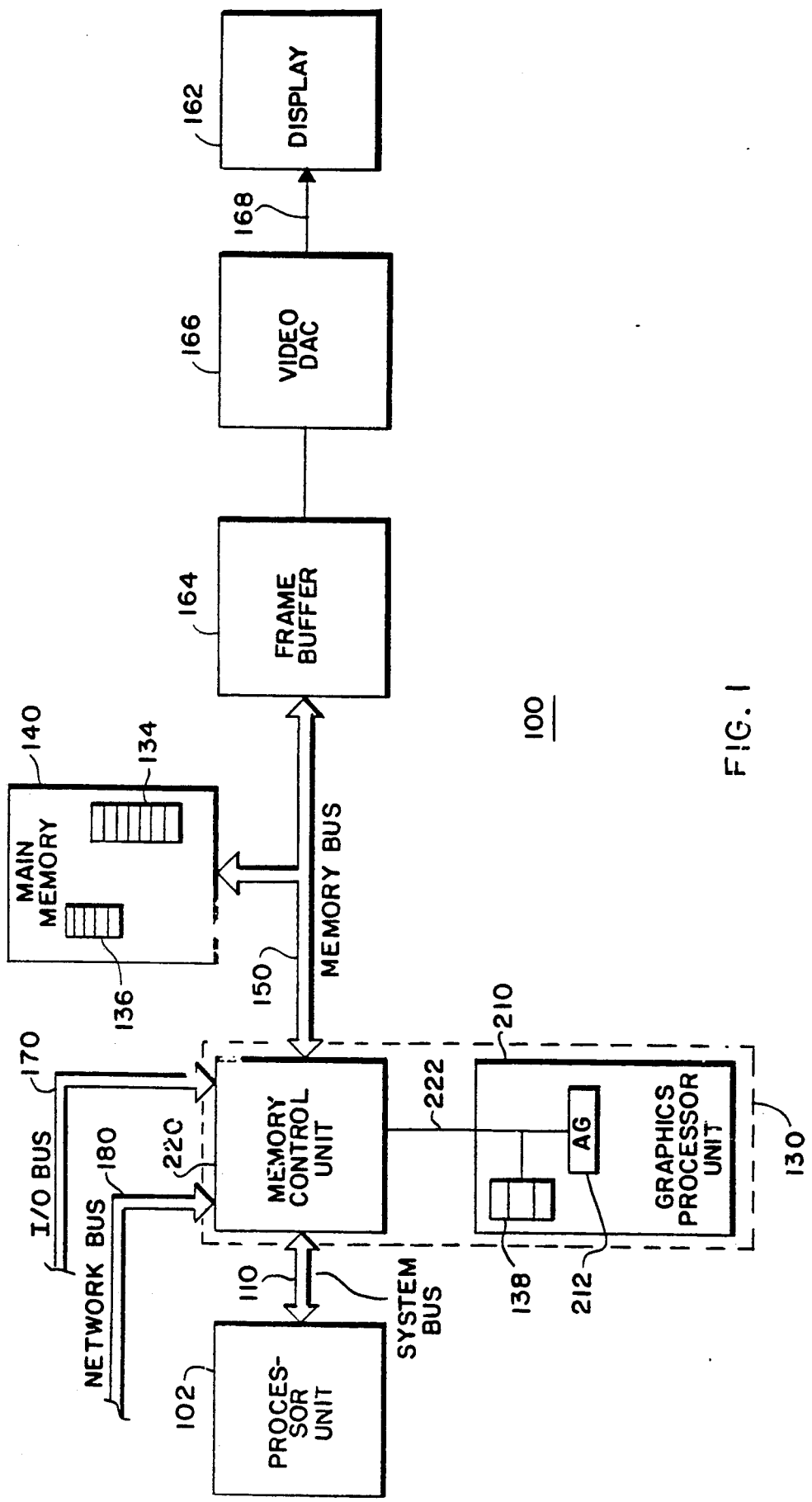
FIG. 1 is a block diagram of the computer graphics system according to the invention.

FIG. 1 shows a block diagram of a computer graphics system 100, according to the invention. Processor unit 102 is interconnected, via a system bus 110, for communication with a memory control unit 220. A main memory 140 is connected, via memory bus 150 to the memory control unit 220 as well as to the frame buffer memory 164. Frame buffer memory 164 is in turn connected to a video DAC 166, which reads data, in digital form, from frame buffer memory 164, and converts the data to video signals, which are transmitted to display 162 over video signal line 168. A graphics processor unit 210 is connected to memory control unit 220 via pixel data bus 222. Graphics processor unit 210 and memory control unit 220 are included in a functional unit, the graphics/memory control unit 130, which may be, for example, implemented on a single computer chip. In a preferred embodiment of the invention, graphics/memory control unit 130 is implemented on a single computer chip.

The memory control unit 220 is interconnected to the I/O bus 170 and the network bus 180, each of which is bidirectional for data/address transfers through, to and from the memory control unit 220.

Included in main memory 140 are FIFO command buffer 134 and clip list 136. FIFO command buffer 134 is a reserved, contiguous section of main memory 140 that is used as a FIFO buffer for a stream of graphics commands. Clip list 136 is an alternate stream of commands, also stored in main memory 140. A command in FIFO command buffer 134 causes the command stream to switch from FIFO command buffer 134 to clip list 136. The operation of FIFO command buffer 134 is described in more detail below.

Residue buffer 138 is a set of three registers in graphics processor unit 210 that serves as a temporary storage area for portions of graphics transmissions to address generator 212 that are not immediately usable by address generator 212. The operation of residue buffer 138 is described below.

Processor unit 102 generates graphics commands, for processing in graphics processor unit 210, by address generator 212, and transmits the graphics commands over system bus 110 to memory control unit 220. The graphics commands are transmitted from processor unit 102 to memory control unit 220, using normal memory write mechanisms, whenever system bus 110 is available. Graphics command are transferred in the form of a write to an address in a pre-defined range of addresses that signify that the data being written is a graphics command. From graphics commands, memory control unit 220 ignores the address specified by processor unit 102, but instead writes the command to the tail of FIFO command buffer 134; the address following becomes the new tail of FIFO command buffer 134.

Graphics commands are transmitted from FIFO command buffer 134 or clip list 136 to graphics processor 210 over memory bus 150 and pixel data bus 222 in uniform transmission units of four thirty two bit words. The command structure used by the invention allows for command "packets" of from one to four thirty two bit words in length. Therefore, a transmission unit may contain portions of more than one graphics command.

The portion of the four word transmission packet that contains a first graphics command is immediately transmitted to the address generator 212 for processing. The remainder of the four word transmission packet, called the "residue", is stored in residue buffer 138.

When the address generator has completed processing the first graphics command, the contents of residue buffer 138 is sent to the address generator for processing.

Thus, the residue buffer allows transmission units from main memory 140 to address generator 212 to be of uniform length, while allowing the graphics commands to be of non-uniform length. In addition, the residue buffer provides a temporary storage area in close proximity to address generator 212, thereby minimizing the amount of time that address generator 212 is idle.

Other features and advantages of the invention can be seen in a more detailed description of the computer graphics system 100 and its components, which are described below.

Computer Graphics System

Figure 2A:
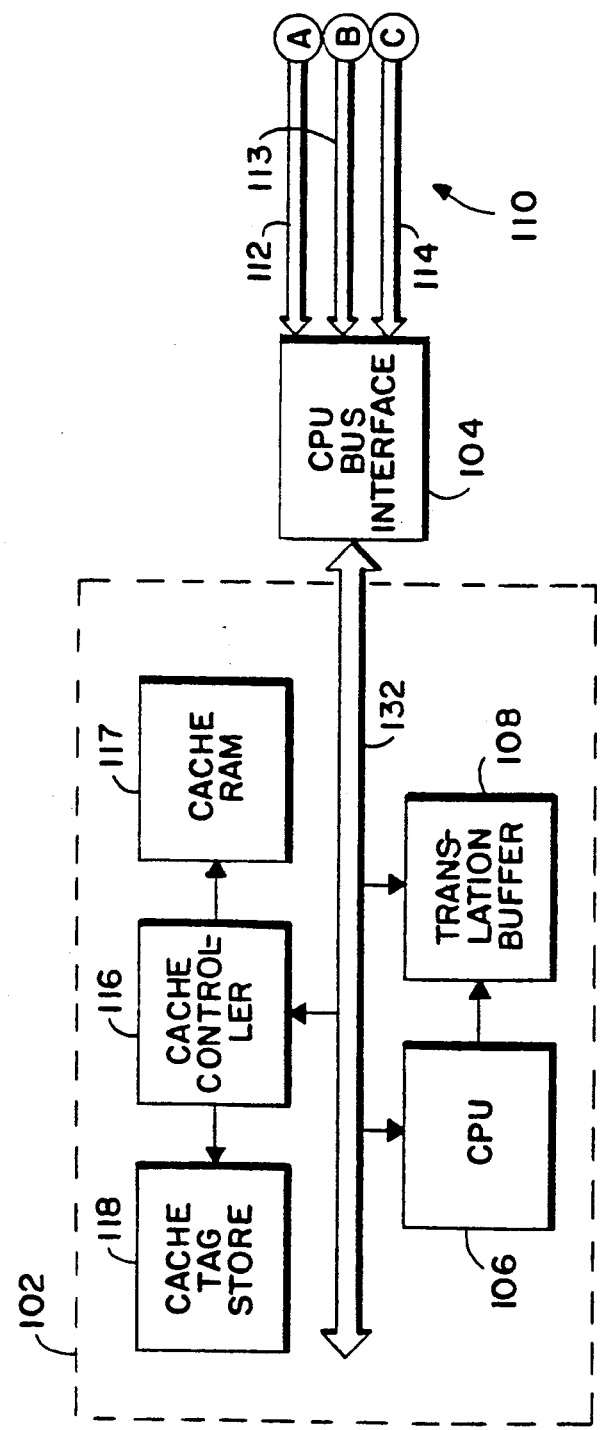
FIGS. 2A and 2B is a block diagram of the computer graphics system of FIG. 1, in greater detail.
Figure 2B:
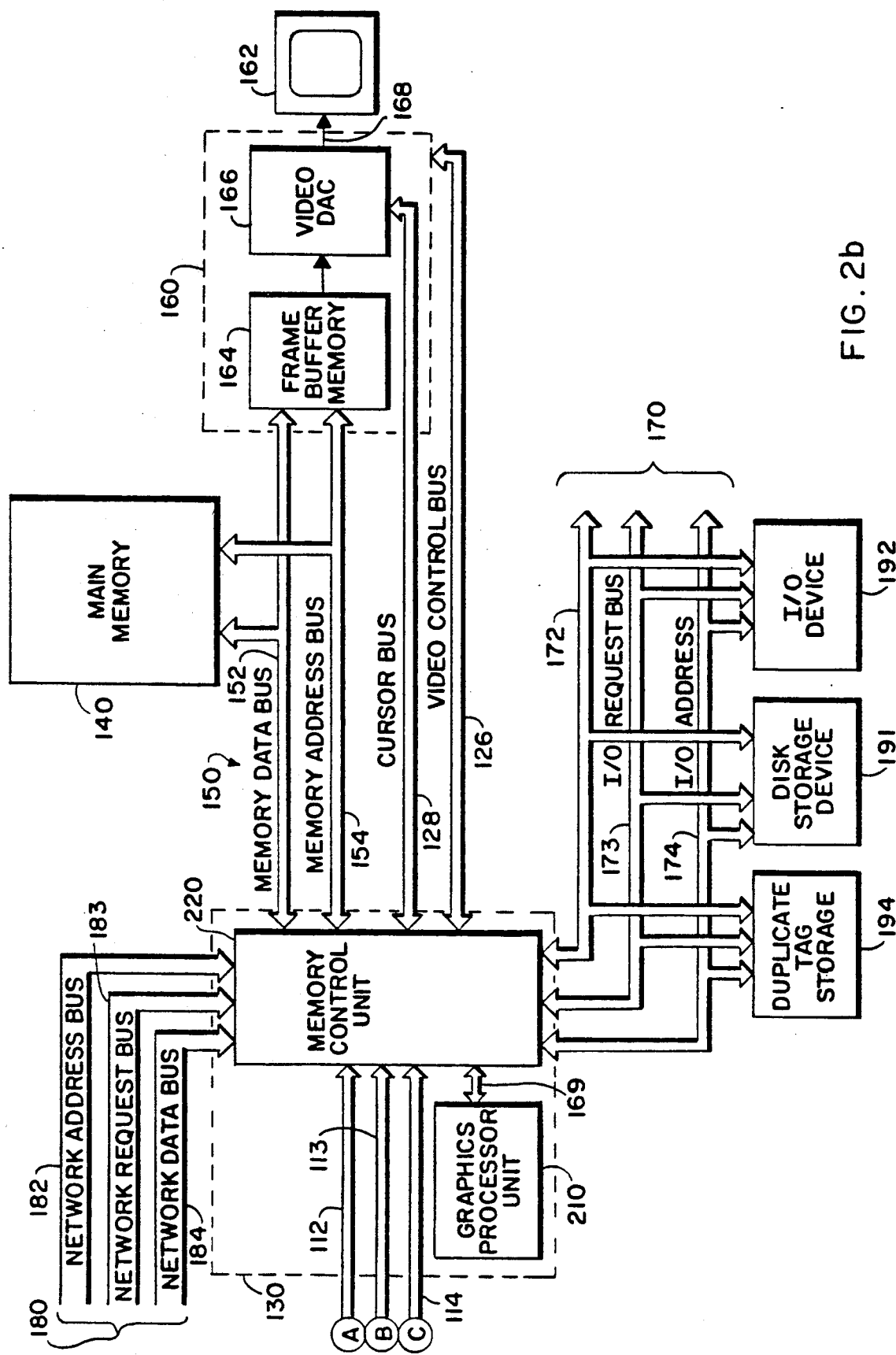

FIG. 2 shows a block diagram of a computer graphics system 100 according to the invention. A computer graphics system may be connected to a computer network by network bus 180 as shown, or may be incorporated within a single user workstation or a multi-user computer. The computer graphics system 100 includes functional units, such as a processor unit 102 (depicted within a broken line block) interconnected, via a CPU bus interface 104 to a system bus, generally designated 110, for communication with a graphics/memory control unit 130. The system bus 110 is shown as a plurality of buses, designated 112, 113, and 114, each of which, respectively, transfer data information (bus 112), request information (bus 113) and address information (bus 114). A main memory 140 is connected, via memory data and address buses 152 and 154, respectively, to the graphics/memory control unit 130 as well as to the video unit 160 (shown in broken lines), which, in turn controls the display 162. The video unit 160 includes therein a frame buffer memory 164 and a DAC (digital to analog convertor) 166.

The graphics/memory control unit 130 is interconnected to a plurality of bus structures, each of which is bidirectional for data/address transfers through, to and from the graphics/memory control unit 130. Such bus structures include the video unit 160 control bus structure, that is, video control bus 126 and the cursor bus 128; the I/O bus structure 170, that is I/O data bus 172, I/O request bus 173, and I/O address bus 174; and a network bus structure 180, such as data bus 182, request bus 183, and address bus 184. Connected to the I/O bus structure 170 may be any type of peripheral device, such as disk storage device 191 and any other suitable I/O device 192. Also connected to I/O bus 170 for reasons which will be hereinafter discussed, is a duplicate tag store 194.

Figure 3A:
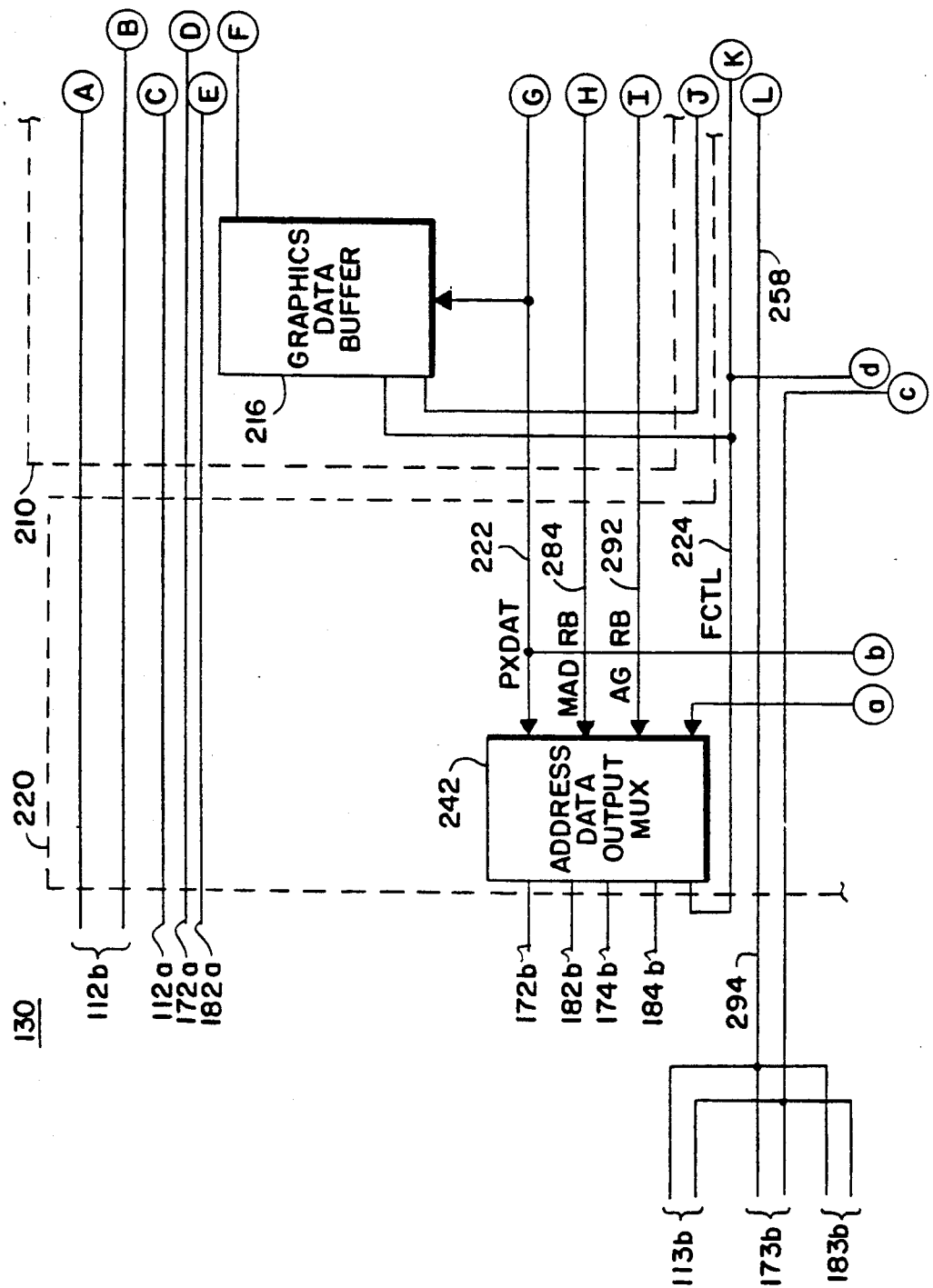
Figure 3B:
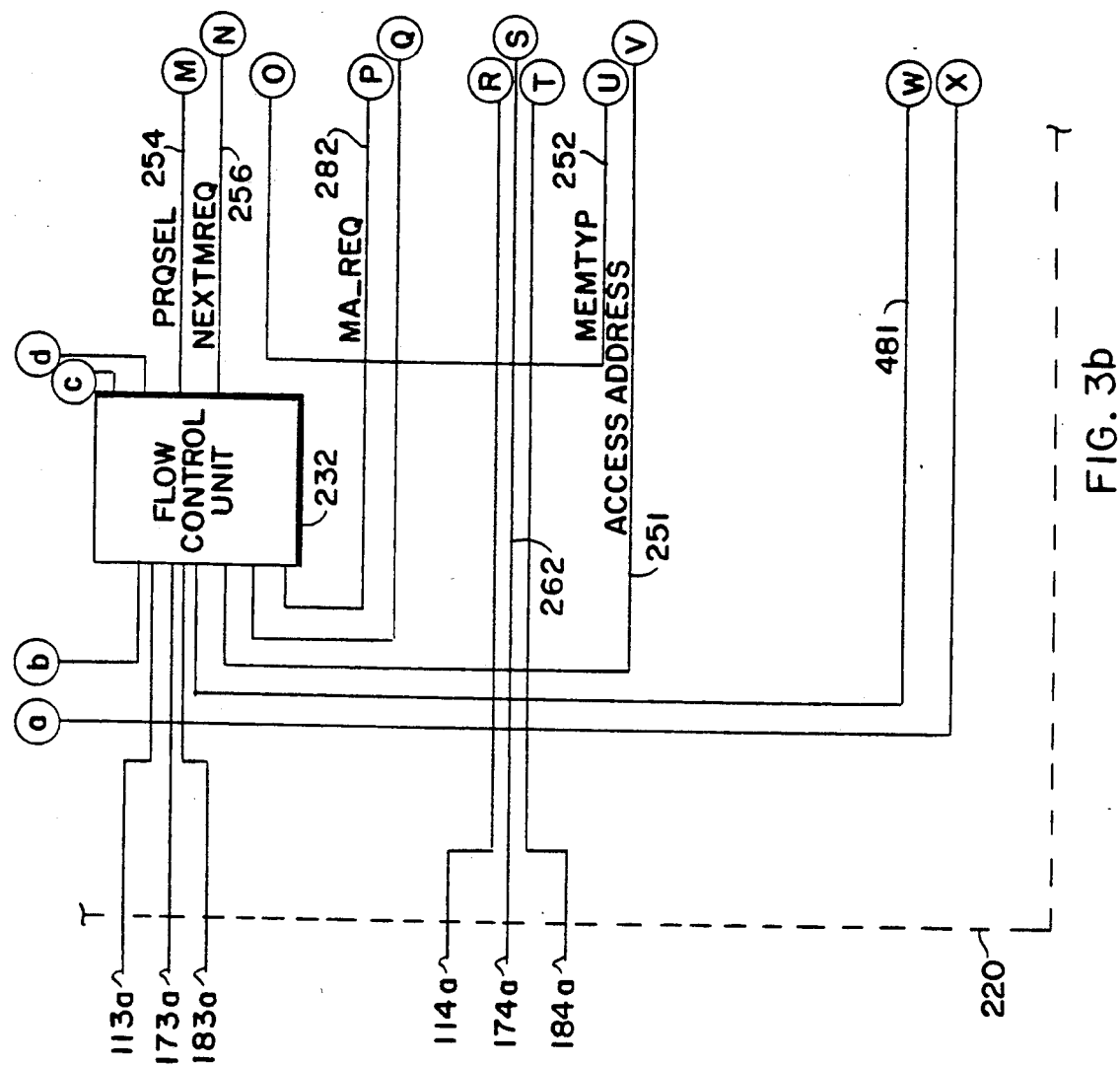
Figure 3D:
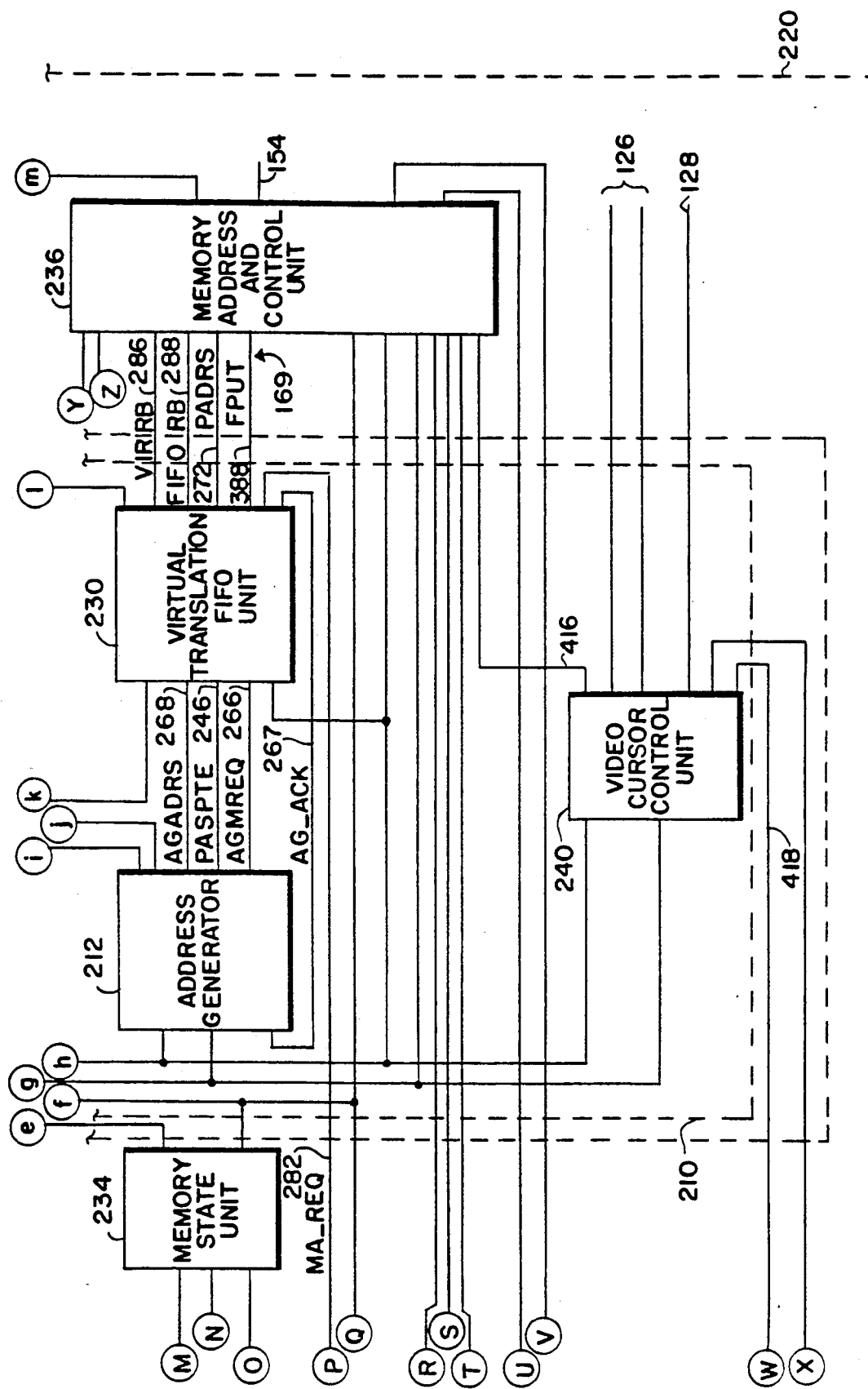
Figure 4A:
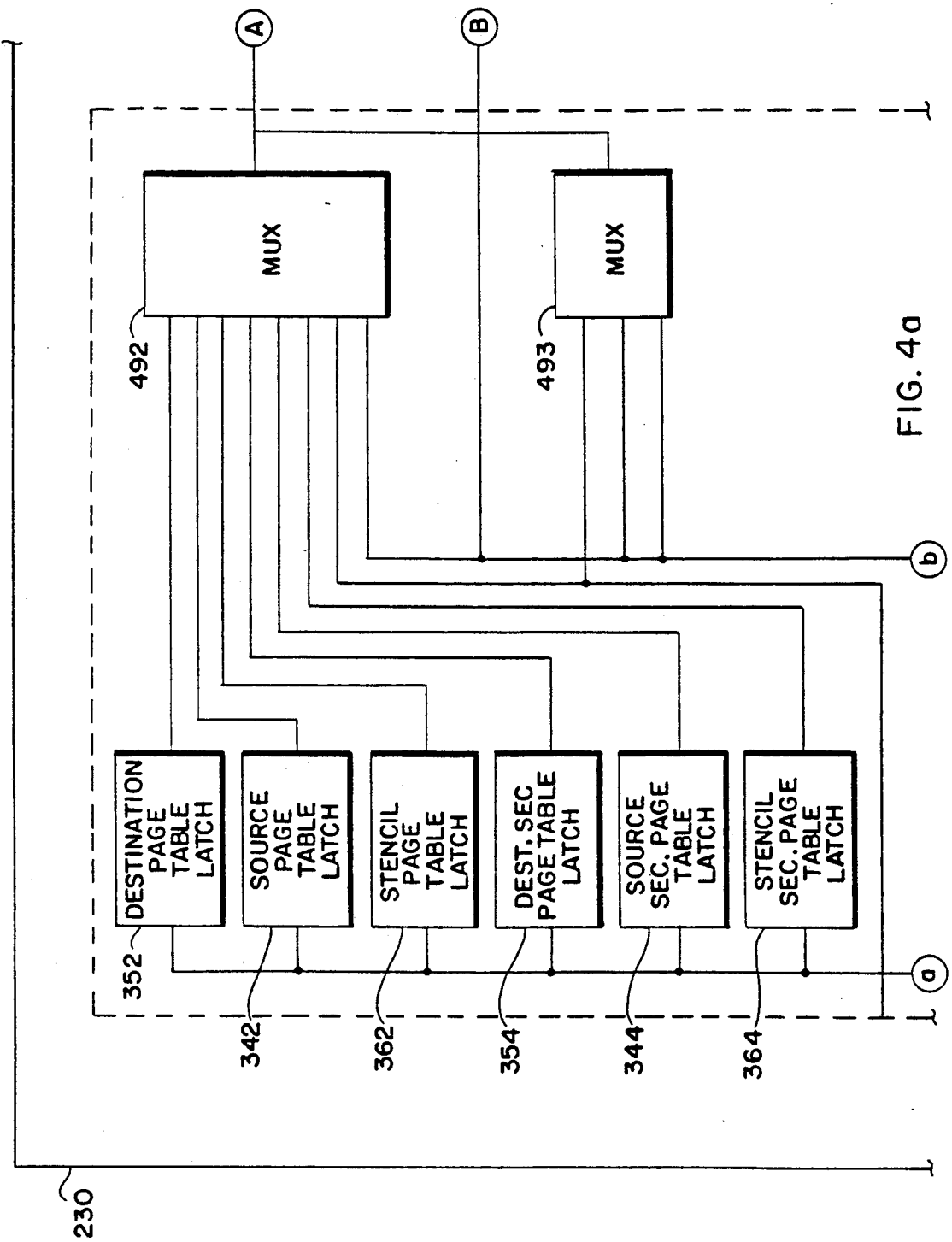
FIGS. 4a-4d is a block diagram of the virtual translation/FIFO control unit.
Figure 4B:
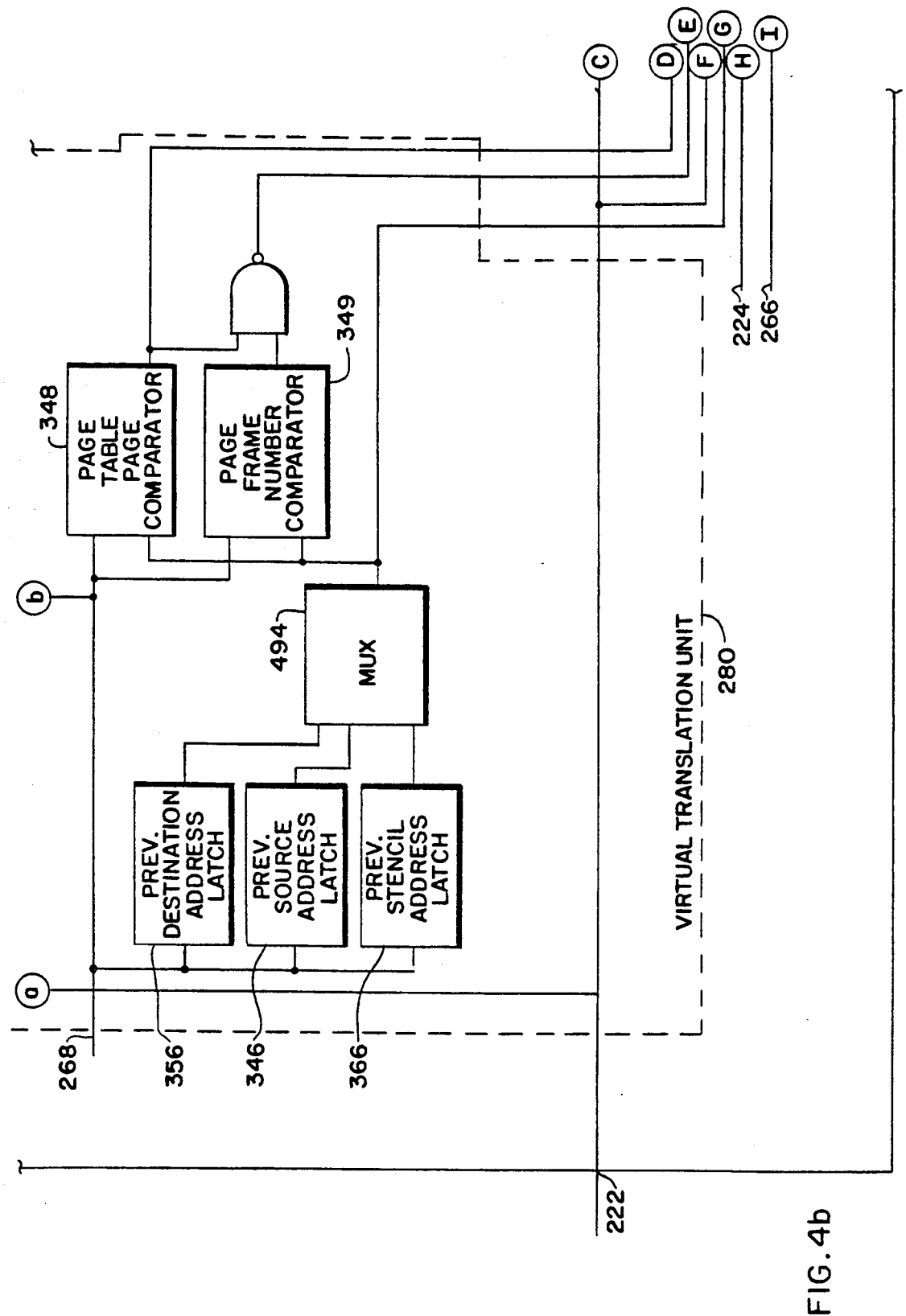
Figure 4C:
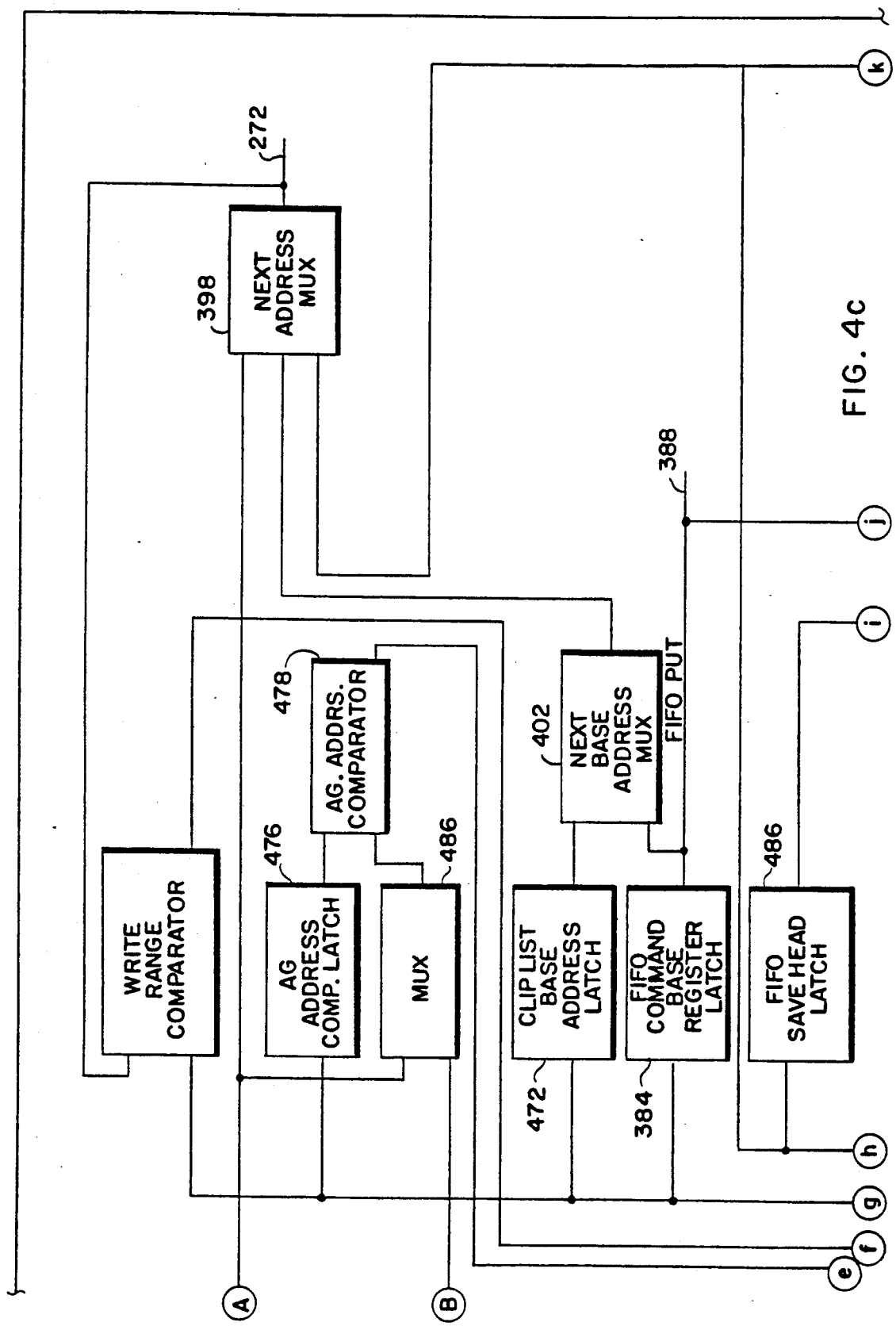
Figure 4D:
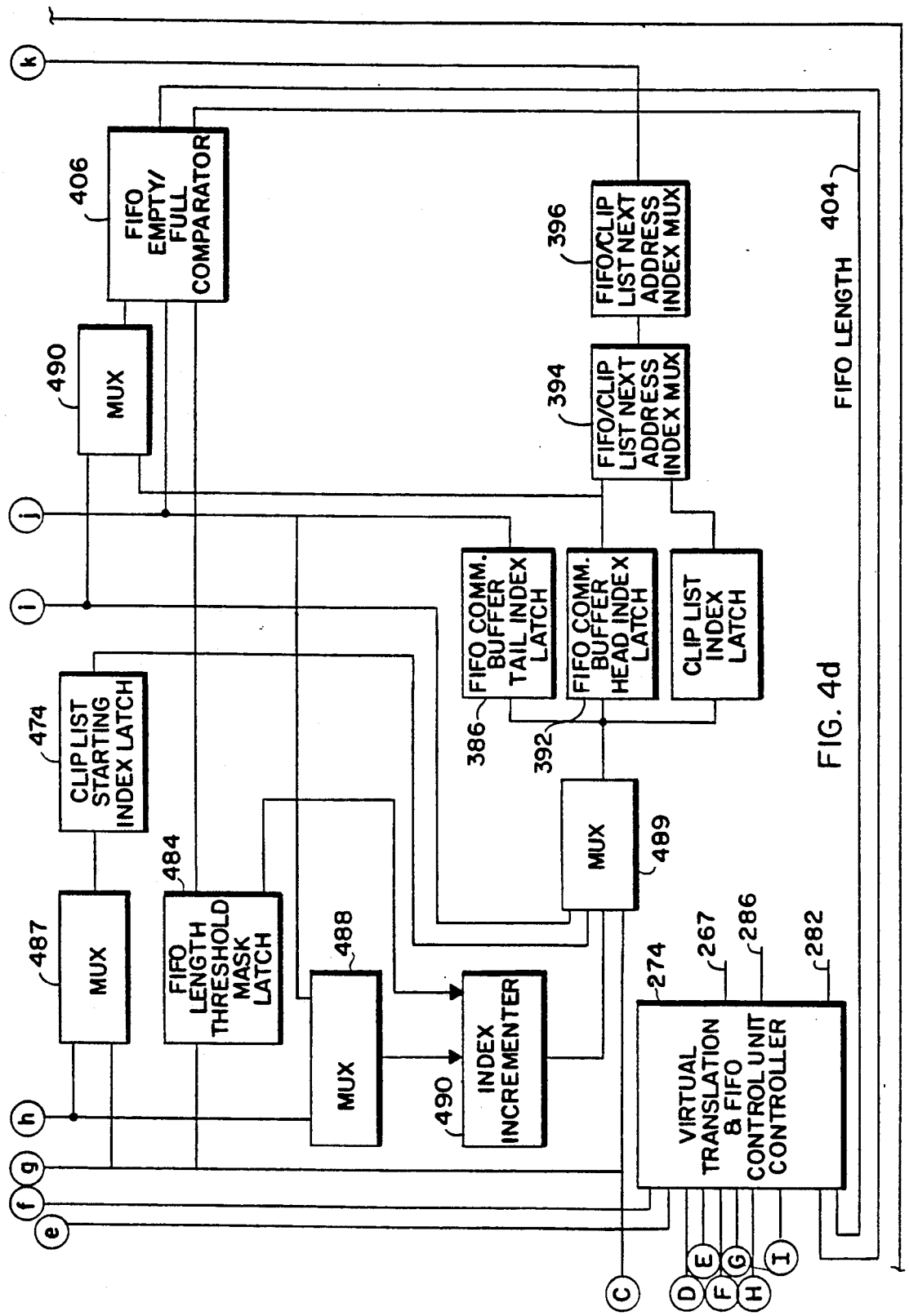

Referring now to FIG. 3, Graphics/memory control unit 130 consists of two major units, graphics processor unit 210, and memory control unit 220.

As shown in FIG. 3, graphics processor unit 210 consists of address generator 212, pixel shift logical unit (pixel SLU) 214, virtual translation/FIFO control unit 230, mask generator 216, graphics data buffer 218, and video/cursor control unit 240, all interconnected the pixel data bus (PXDAT) 222 and flow control bus (FCTL) 224. Address generator 212 transmits control signals via address generator control line 226 (AGCTL) to graphics data buffer 218, mask generator 216, and pixel SLU 214, and receives acknowledgement signals from virtual translation/FIFO control unit 230 over $AG_{13}ACK$ line 267. Address generator mask lines AGBMSK 276 and AGWMSK 278 transmit signals from mask generator 216 and pixel SLU and memory address and control unit 236, respectively. Memory address and control unit 236 sends readback data on MADRB line 284, VIRRB line 286, and FIFORB line 288, and address generator 212 sends readback data on AGRB line 292. The various graphics processor unit elements are also connected by a number of signal lines, which will be explained as they become useful to the description of the operation of the graphics processor unit. Graphics processor unit 210 is connected to video control bus 126 and cursor bus 128.

Memory control unit 220 consists of flow control unit 232, memory state unit 234, memory address and control unit 236, memory data buffer 238, and address/data output multiplexer (mux) 242, all connected by memory control line (MEMCTL) 244. Pixel SLU 214 is a part of both memory control unit 220 and graphics processor unit 210. Memory address and control 236 unit sends signals to flow control unit 232 and memory state unit 234 over ACCESSADRS line 251 and MEMTYP line 252, respectively. The interconnections between the component units of memory control unit 220 will be described below in an illustrative example of a memory request by disk storage device 191.

Certain of the component units of memory control unit 220 communicate various types of information over the various bus structures. Flow control unit 232 receives memory requests from incoming portions 113a, 173a, and 183a of the system request bus 113 (of FIG. 2), the I/O address bus 173 (of FIG. 2), and the network address bus 183 (of FIG. 2), respectively. Flow control unit 232 acknowledges memory requests through external acknowledgment line 294, which connects to outgoing portions 113b, 173b, and 183b of the system request bus 113 (of FIG. 2), the I/O request bus 173 (of FIG. 2), and the network address bus 183 (of FIG. 2), respectively. The memory address and control unit 236 receives the address portion of a memory request over incoming portions 114a, 174a, and 184a of the system address bus 114 (of FIG. 2), the I/O address bus 174 (of FIG. 2), and the network address bus 184 (of FIG. 2), respectively. Address/data output multiplexer 242 sends data on outgoing data portions 172b and 182b of the I/O data bus 172 (of FIG. 2) and the network data bus 182 (of FIG. 2), respectively, and sends address information over outgoing address portions 174b and 184b of the I/O address bus 174 (of FIG. 2), and the network address bus 184 (of FIG. 2), respectively. Data is received by pixel SLU 214 over incoming data portions 112a, 172a, and 182a of system data bus 112 (of FIG. 2), I/O data bus 172 (of FIG. 2), and network data bus 182 (of FIG. 2), respectively. Memory address and control unit 236 sends address and control information over memory address bus 154 to main memory 140 (of FIG. 2) and frame buffer memory 164 (of FIG. 2). Memory data buffer 238 sends data to and receives data from main memory 140 (of FIG. 2) and frame buffer memory 164 (of FIG. 2) over memory data bus 152, and also sends data to CPU bus interface 104 (of FIG. 2) over outgoing data portion 112b of system bus 112 (of FIG. 2).

The method by which graphics/memory control unit 130 accomplishes a desired result of processing a memory transaction without causing a transmission on system bus 110, and without any action by processor unit 102, is most easily understood by an example of a memory read request from a system component, such as disk storage device 191. A memory request consists of at least two parts, namely a request information part, which contains information about the requester, and an address part, which contains the memory address of the requested data. The request part and the addressed part are processed separately.

The request information part is transmitted over request portion 173a, of I/O request bus 173, to flow control unit 232. Flow control unit 232 prioritizes the request and transmits request information over prioritized request identification (PREQSEL) line 254 and next memory request (NEXTMREQ) line 256 to memory state unit 234. Information transmitted includes information about the requester (in this example disk storage device 191), access type, and operand size. Memory state unit 234 transmits the request information to memory address and control unit 236 over request identification (REQSEL) line 258.

The address part of the memory location that is requested is transmitted over address portion 174a of I/O data bus 174 directly to memory address and control unit 236. Memory address and control unit 236 sends request information on memory address bus 154.

Contents of address are returned over memory data bus 152 to memory buffer 238 and are then sent to pixel SLU 214 over memory data (MEMDAT) line 264. Pixel SLU 214, in turn transmits the data over pixel data bus (PXDAT) 222 to address and data output multiplexer 242 to disk storage device 191 over outgoing I/O data bus 172b. A request for a memory read by processor unit 102 proceeds in the same manner, except memory buffer 238 transmits the data to processor unit 102 over outgoing system data bus 112b.

Those skilled in the art will appreciate from this example that reads from memory or writes to memory can be accomplished in a like manner by other devices attached to one of the bus structures. Those familiar with the art will also note that the memory request by disk storage device 191 proceeds without any action by processor unit 102, and with no traffic on the system bus 110.

The interconnections of the elements of the graphics/memory control unit 130 also allows the processing of memory request by graphics processor unit 210 without any action by processor unit 102 and without causing any traffic on system bus 110.

Memory requests by graphics processor unit 210 are issued by the address generator 212. Address generator 212 issues request information over address generator request (AGMREQ) line 266, to virtual translation/FIFO control unit 230. Virtual translation/FIFO control 230 unit in turn transmits the request to flow control unit 232 over MAREQ line 282, which prioritizes the request, and transmits the request to memory address and control unit 236 over REQSEL line 258.

The address part of the memory request is transmitted to virtual translation/FIFO control unit 230 over address generator address (AGADRS) line 268. The address is translated, if necessary, to a physical address by virtual translation/FIFO control unit 230 in a manner that will be described below. The address is then sent to memory address and control unit 236 over physical address (PADRS) line 272. The memory address and the request information are then sent over memory address bus 154.

If the memory access is a read from memory, the data is returned over memory data bus 152 to memory data buffer 238, which in turns transmits the data to pixel SLU 214. If the memory access is a write to memory, the data is transmitted from pixel SLU 214 to memory data buffer 238 and then to main memory (140 of FIG. 2) over memory data bus 152.

Thus, the method of processing memory requests issued by the graphics processor unit 210 and the method of processing memory requests issued by other system components both include the steps of transmitting a request information part to flow control unit 232; transmitting an address part to memory address and control unit 236; and the receiving or sending of the requested data by pixel SLU 214. It can also be noted that the memory access was executed in both cases without any action by processor unit 102, and without causing any traffic on system bus 110.

The address contained in the address part of the memory request can be any memory address that is accessible by memory address bus 154. Thus, by referring to FIG. 2, it can be seen that the graphics processor unit 210 can access both main memory 140 and frame buffer memory 164 and thus can transfer information between main memory 140 and frame buffer memory 164.

Virtual Translation

A feature of the invention is the method by which virtual addresses are translated to physical addresses.

As mentioned above, if the address part of a memory request by graphics processor unit 210 is a virtual address, the virtual address is translated to a physical address by virtual translation/FIFO control unit 230, which is shown in greater detail in FIG. 4. AGMREQ line 266 transmits signal packets containing eight bits from address generator 212 to virtual translation/FIFO control unit controller 274. Bit position seven indicates whether the address that is requested on AGADRS line 268 is a physical address or a virtual address. If the signal on AGMREQ line 266 indicates that the address that is requested on AGADRS line 268 is a virtual address, virtual translation/FIFO control unit controller 274 causes the address on AGADRS line 268 to enter virtual translation unit 280 (shown enclosed in broken lines in FIG. 4).

Virtual translation unit 280 has separate translation units for source, destination, and stencil operands. The components of the translation units are multiplexed through multiplexers 492, 493, 494. The virtual translation of a source operand will be described, however it should be understood that virtual addresses for destination and stencil operands can be translated in a similar manner.

The translation of a virtual address is more easily understood by first briefly discussing virtual address translation generally. In a system with virtual memory, the amount of main memory available to a program is more than the amount of main memory (140 of FIG. 2) that is actually present in the computer system. The program operates on memory locations specified as "virtual addresses". The data identified by a virtual address may actually reside in main memory (140 of FIG. 2) or in some other system component, such as a disk storage device 191.

Virtual addresses consist of references to various tables, called "page tables" which record the physical locations of virtual address. The translation of virtual addresses is done by examining the various tables.

Figure 5:
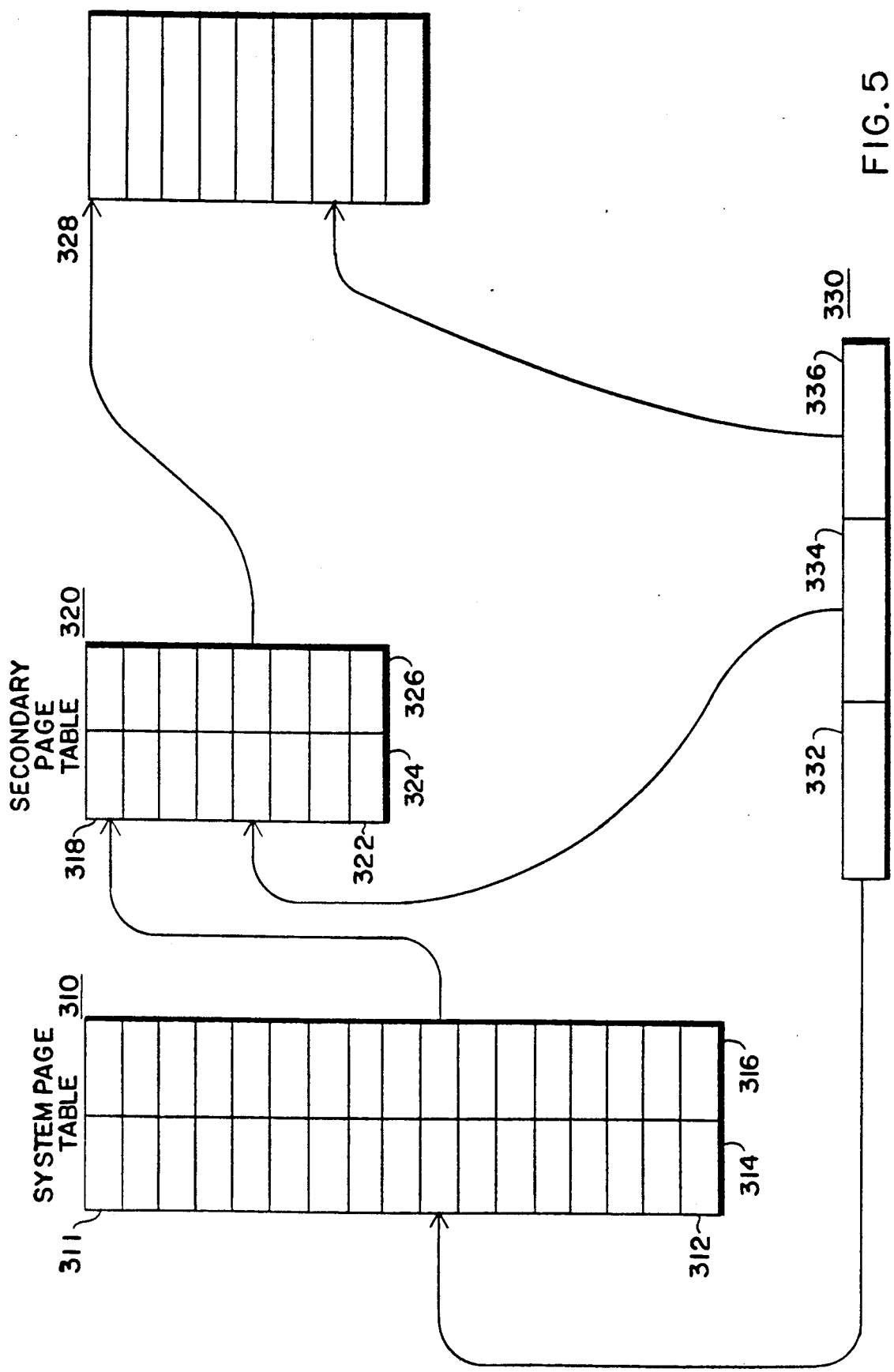
FIG. 5 is a diagram showing the translation of a virtual address to a physical address.

Referring to FIG. 5, system page table 310 is a data base, stored in main memory, accessible by the computer operating system. The main memory address 311 of the first entry in system page table 310 is fixed by the operating system, and known to the address generator 212 of FIG. 3. Each of the entries 312 of system page table 310, referred to as "page frame numbers," consists of two portions. First portion 314 contains a "valid" bit, an access code, and a modify bit which will be discussed below. Second portion 316 contains the base address 318 of a secondary page table 320. Secondary page table 320 may be present in main memory 140 (of FIG. 2), or may be stored in some other system location, such as a disk storage device 191. If secondary page table 320 is present in main memory, the "valid" bit in first portion 314 of system page table entry 312 identifying secondary page table 320 is set to a "valid" state. If secondary page table 320 is not present in main memory 140, the "valid" bit in the identifying entry 312 is set to "invalid".

Each of the entries 322 of secondary page table 320 consists of two portions. First portion 324 contains a "valid" bit, an access code, and a modify bit, which will be discussed below. Second portion 326 contains the base address 328 of the section, or "page" of main memory (140 of FIG. 2) corresponding to the virtual address. If the "valid" bit in first portion 324 of secondary page table identifying entry 322 is set to "valid", the current physical location of the data identified by the virtual address is in main memory. If the "valid" bit in the identifying entry 322 is set to "invalid", the data identified by the virtual address may not be present in main memory 140.

A virtual address 330 consists of three sections. First section 332 is an index, identifying the address of the entry relative to the base address 311 of system page table 310. Second section 334 is an index, identifying the address of the entry relative to the entry in the base address 318 of the secondary page table 320. Third section 336 is an index which identifies the main memory location relative to the base address 328.

The translation of a virtual address consists of examining the contents of the entry obtained by indexing, from base address of system page table 310, by the index specified in virtual address first section 332, to find the base address 318 of the secondary page table 320; indexing into secondary page table 320 by the index specified in virtual address second section 334 to find the base address 328 of the page of main memory which contains the desired data; and indexing into the page of main memory by the index specified in virtual address third section 336 to find the actual physical address of the desired data. The process is made more efficient by arranging the addressing method such that virtual address third section 336 is concatenated onto the address stored in second section 326 of entry 322 of secondary page table 320 to obtain the physical address of the desired data.

An analysis of the process described above shows that a virtual address translation involves accessing two memory locations to translate the physical address. One way for reducing the number of memory locations that must be accessed to translate a virtual address is to record, in a memory buffer, the virtual address first section 332 and second section 334 of each virtual address that is translated, and the corresponding secondary page table base address 318, and main memory base address 328 that the virtual address first section 332 and second section 334, respectively, signify. A memory buffer used for this purpose is known as a "translation buffer." If the next virtual address to be translated has the same first section 332 and second section 334 as the value stored in the translation buffer, the physical address is available without any need to access any memory locations. It can be further noted that if the next virtual address to be translated has the same first section 332, but a different second section 334, than the value stored in the translation buffer, then the base address 318 of secondary page table 320 is immediately available, without having to access system page table 310.

In the current implementation of the invention, bits <29:16> (that is, bits 29 through 16) of a virtual address correspond to virtual address first section 332; bits <15:9> correspond to virtual address second section 334; and bits <8:2> correspond to virtual address third section 336.

Referring again to FIG. 4, source page table page latch 342 contains the base address (corresponding to 318 of FIG. 5) of the secondary page table specified by the most recently translated virtual address of a source operand. Source secondary page table latch 344 contains the base address 328 of the page of main memory of the most recently translated virtual address of a source operand. Previous source address latch 346 contains the most recently translated source virtual address. Latches 346, 342, and 344 collectively are the source translation buffer.

The virtual address on AGADRS 268 enters virtual translation unit 280. In addition, the address generator calculates a main memory address obtained by indexing by the index specified in address bits <29:16>, and transmits the result to virtual translation unit 280 on PASPTE line 246, for reasons that will be apparent later. Bits <29:16> of the virtual address are compared, in page table page comparator 348, with bits <29:16> of the address stored in previous source address latch 346. Bits <15:09> are compared, in page frame number comparator 349, with bits <15:09> of the address stored in previous source address latch 346. If page table page comparator 348 indicates a match, and page frame number comparator 349 also indicates a match, the virtual address is translated to a physical address by concatenating bits <8:2> of the virtual address onto the value stored in source secondary page latch 344.

If page table page comparator 348 indicates a "hit", but page frame number comparator 349 indicates a miss, the base address (corresponding to 318 of FIG. 5) of the secondary page table (corresponding to 320 of FIG. 5) identified by the value in source page table latch 342 is indexed by bits <15:09> of the virtual address to be translated to yield the base address (corresponding to 328 of FIG. 5) of the section, or "page" of main memory in which the desired data is located. The contents of bits <8:2> are then concatenated to the base address to yield the main memory address of the desired data. The contents of base address (corresponding to 328 of FIG. 5) of the page of main memory containing the desired information are then stored in source secondary page latch 344. In addition, the access code is checked. If the access code indicates that the base address (corresponding to 328 of FIG. 5) of the page of main memory containing the desired information is in a section of memory to which the graphics unit 130 is not allowed access, a signal is generated by virtual translation and FIFO control unit controller 274) which prevents the memory access from occurring. If the type of memory access is a write to memory, the modify bit is also checked. If the modify bit indicates that the page of main memory containing the desired information has not previously been written to, a signal is generated which causes the operating system to change the modify bit in the entry in the secondary page table (corresponding to 320 of FIG. 5).

If page table page comparator 348 indicates a miss, virtual translation/FIFO control unit controller 274 retrieves the address transmitted on PASPTE line 246, which contains the base address of the secondary page table 320. The process then proceeds as described above if page table comparator 348 had indicated a "hit" but page frame number comparator 349 had indicated a miss.

If the "valid" bit in the address stored in source page table latch 342 or source secondary page table latch 344 is set to "invalid" then an interrupt is sent to CPU 106 and the graphics system halts. CPU 106 fetches the data into main memory, if necessary (typically from disk storage device 191, sets the "valid" bit in the appropriate entry in the system page table 310 or secondary page table 320 to "valid", and restarts the graphics system. Virtual translation unit 280 then proceeds as if page table comparator 348 had indicated a "miss".

Those familiar with the art will understand that destination translation buffer (consisting of destination page table page latch 352, destination secondary page table page latch 354, and previous destination address latch 356) and stencil translation buffer (consisting of stencil page table page latch 362, stencil secondary page table page latch 364, and previous stencil address latch 366) operate in a similar manner as described above with regard to source operands.

Referring to FIG. 2, processor unit 102 contains a CPU translation unit 108 which has a translation buffer similar to the source translation buffer described above. If a virtual address is displaced from main memory 140 (typically to a disk storage device 191), then the corresponding entry in system page table is set to "invalid", as is the corresponding entry, if present, in the translation buffer in CPU translation unit 108. The next time that virtual address is translated, the computer's operating system reads that information from the disk storage device 192 into main memory 140, and places an entry, indicating the location of the data, and that the data is valid, in the translation buffer in CPU translation unit 108. When an entry in the translation buffer in CPU translation unit 108 is marked "invalid", the invention provides two methods for maintaining consistency between the system page table page and the entries in the translation buffers in virtual translation unit 230. Referring to FIG. 4, in one method, if any entry in system page table is marked "invalid", the address is transmitted to virtual translation/FIFO control unit controller 274 which compares the appropriate portion of the address with the address portions in page table latches 342, 344, 352, 354, 362, and 364; if a matching address is found, the corresponding entry is marked "invalid". In a second method, if any entry in the system page table is marked invalid, all entries in virtual translation unit 280 are marked invalid.

Thus, in either method, any entry that is marked as "invalid" in the system page table will also be marked "invalid" in the virtual translation unit 280. Stated differently, virtual translation unit 280 will never have an entry marked as "valid" when the corresponding entry in the system page table is marked as "invalid". In addition, a translation of a virtual address by virtual translation unit 280 results in the same physical address as a translation of that same virtual address by the processor unit 102.

Duplicate Tag Store

Referring again to FIG. 2, another feature of the invention is the provision of duplicate tag store 194, situated relative to other system elements in a manner that enables graphics processor unit 210, as well as other system components, such as disk storage device 191, to effect a search of duplicate tag store 194 without creating traffic on system bus 110. Duplicate tag store 194 is located on the same side of the system bus as graphics/memory control unit 130, network data bus structure 180, and I/O data bus structure 170. Specifically, duplicate tag store 194 is connected to I/O data bus structure 170. The purpose of duplicate tag store 194 is to ensure coherency between the information in CPU cache RAM 117 and the corresponding address in main memory 140.

In the current implementation, processor unit 102 may have a six-way associative or a direct-mapped write-through cache tag store 118. Whenever a main memory location is read into processor cache tag store 118 or displaced from processor cache tag store 118, the same main memory location is read into, or displaced from, duplicate tag store 194. Thus the contents of duplicate tag store 194 are identical to processor cache tag store 118.

Memory transaction occurs are acknowledged by memory state unit (234 of FIG. 3) external address acknowledgement line (294 of FIG. 3), which connects to outgoing portions 113b, 173b, and 183b, of the system request bus 113, the I/O request bus 173, and the network bus 183, respectively. The information indicates the type of memory transaction (such as a read or a write) and the address in main memory 140 that is involved in the transaction. If a memory transaction is a write to an address in main memory 140 by some device other than CPU 106, duplicate tag store 194 searches its contents to see if there is a match with an entry in duplicate tag store 194.

If there is no match, duplicate tag store takes no further action. If there is a match, duplicate tag store 194 issues an invalidate request to processor unit 102. Cache controller 116 marks corresponding entry in cache tag store "invalid", so the next time that CPU 106 attempts to access that entry, cache controller 116 reads the new value from the corresponding address in main memory 140.

Thus, an invalidate request, and therefore a transaction on system bus 110 occurs only if graphics processor unit 210, or some other system component writes to a location in main memory 140 that is resident in processor cache tag store 118, thereby further reducing traffic on the system bus 110.

FIFO Command Buffer

Figure 6A:
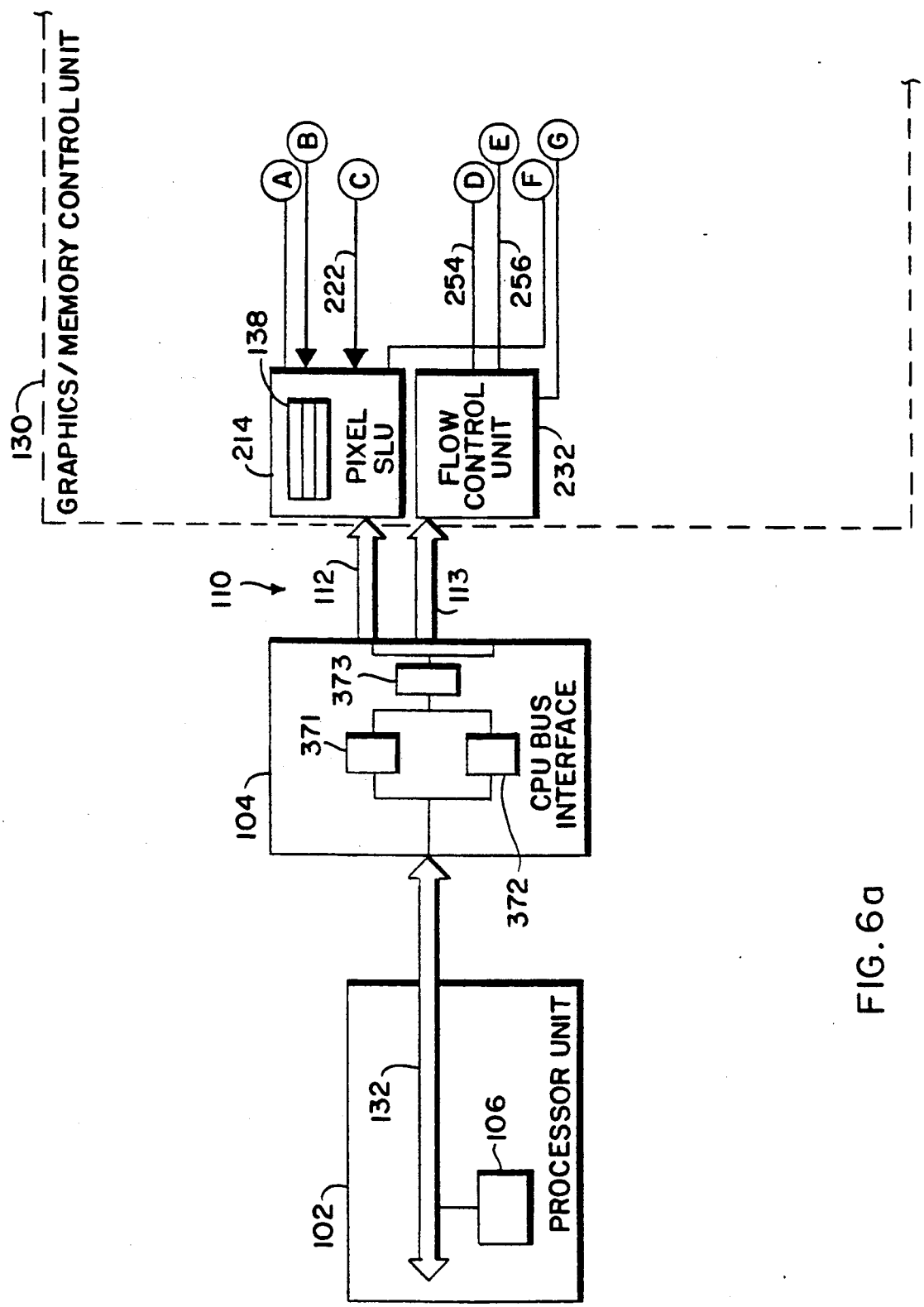
FIGS. 6a and 6b is a block diagram of the elements of the computer graphics system that are involved in the transmission of graphics commands from the processor unit to the graphics processor unit.
Figure 6B:
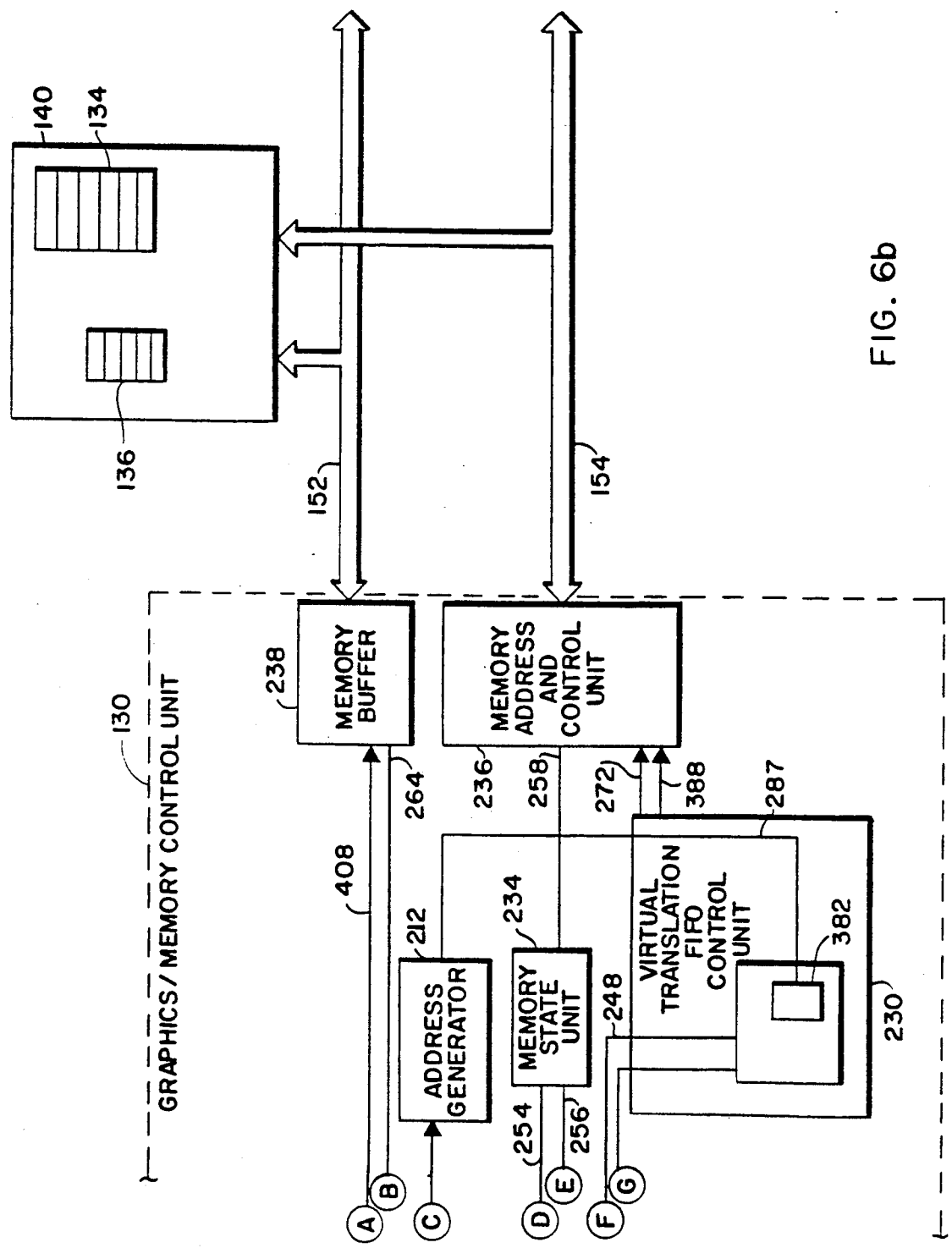

Another feature of the invention is the use of system components to more efficiently transmit commands from processor unit 102 to address generator 212, which processes the commands. This can be understood by referring to FIG. 6, which shows the important elements of the path by which commands are transmitted from processor unit 102 to address generator 212. As will be seen, the invention provides for efficient use of memory write buffers for the transmission of graphics commands; provides a command buffer in main memory 140, which allows processor unit 102 to transmit commands whenever the system bus is available; provides a second buffer, which allows transmissions from the command buffer to the address generator 212 to be of uniform length, even if the commands themselves are of variable length; and provides logic that sends the commands directly from the processor unit 102 to address generator 212 or to the second buffer, if the intervening elements on the transmission path are empty.

In addition to elements already identified, elements in the path by which commands are transmitted from processor unit 102 to address generator 212 include memory write buffers 371, 372, and 373, which are present in CPU bus interface 104; FIFO command buffer 134 which is present in main memory 140; residue buffer 378, which is present in pixel SLU 214; and short circuit logic 382, which is in virtual translation/FIFO control unit 230. Also in virtual translation/FIFO control unit 230 are a number of system components, shown in FIG. 4, involved in the management of FIFO command buffer 134. These components include FIFO command buffer base register latch 384, FIFO command buffer tail index latch 386, and FIFO put (FPUT) line 388, FIFO command buffer head index latch 392, FIFO/clip list next address index multiplexer 394, FIFO/clip list next address index latch 396, next address multiplexer 398, next base address multiplexer 402, FIFO length lines 404, FIFO empty/full comparator 406, FIFO length threshold mask 484, and FIFO save head latch 474. Other components in virtual translation/FIFO control unit 230 relate to the processing of clip lists. These components include clip list base address latch 472 and clip list starting index latch 474. Write range comparator 482 is used to ensure that any addresses accessed by virtual translation/FIFO control unit 230 are within allowable bounds. Other components of virtual translation/FIFO control unit 230 include address generator comparator latch 476 and address generator comparator 478, and multiplexers 486-490.

Referring again to FIG. 6, graphics commands are transmitted from processor unit 102 as writes to a predefined range of addresses in memory. CPU 106 writes graphics commands and other writes to memory, as well as other CPU transactions, on CPU bus 132 to CPU bus interface 104, which identifies the type of CPU transaction. If a transaction is a write to memory, CPU bus interface 104 places the contents of the transaction in one of memory write buffers 371, 372 until the buffer is filled, whereupon it writes further graphics commands and writes to memory into the other of buffers 371, 372. Memory write buffers 371 and 372 alternately send their contents, in the order in which they were filled, to memory write buffer 373, when memory write buffer 373 is empty. Memory write buffer 373 then transmits its contents on system bus structure 110 to graphics/memory control unit 130. Prior to placing the contents of the CPU transaction into the memory write buffers 371, 372, CPU bus interface 104 examines the addresses of the writes to memory to see if there are addresses in the range of addresses designated for graphics commands; if the write to memory within the range, CPU bus interface 104 changes a bit in the memory request portion of the write to memory to indicate that the write to memory is a graphics command. The request portion of the write to memory is sent along system request bus 113, where it is received by flow control unit 232. Flow control unit 232 reads the bit that indicates that the write to memory is a graphics command and signals memory state unit 234 that the write to memory should be sent to the FIFO command buffer 134.

If the write to memory is a graphics command, the CPU specified address portion of the write to memory is ignored. Instead, the address to which the command is sent is calculated in the virtual translation/FIFO control unit 230. Referring now to FIG. 4, FIFO command buffer base register latch 384 stores the memory address of the head of the FIFO command buffer (134 of FIG. 6). FIFO command buffer tail index latch 386 stores the number of FIFO positions between the base address of the FIFO command buffer 134 and the tail of the FIFO command buffer 134 (that is, the current length of FIFO command buffer 134). The contents of the FIFO command buffer tail index latch 386 and the FIFO command buffer base register latch 384 are combined to yield the memory address to which the graphics command should be sent; this address is transmitted on FIFO put (FPUT) line 388. Since memory address and control unit 236 has been previously signaled that the next write to memory is write to FIFO command buffer 134, memory address and control unit 236 reads the address stored on FPUT line 388, and transmits the address on memory address bus 154. When the command is transmitted, index incrementer 496 increments the value in FIFO command buffer tail index latch 386.

Referring again to FIG. 6, the data portion of the write to memory, that is the graphics command itself, is sent along system data bus 112 to pixel SLU 214. Pixel SLU 214 sends the graphics command over memory data out (MDATO) line 408 to memory buffer 238, which transmits the data on memory data bus 152.

When a command is to be fetched from FIFO command buffer 134 for processing, it is processed as a memory request. A memory request is issued to the flow control unit 232 over MAREQ line 282 by the virtual translation/FIFO control unit controller 274. The address for the memory request is generated by the virtual translation/FIFO control unit 230. Referring now to FIG. 4, FIFO command buffer head index latch 392 stores the number of FIFO positions between the base address of the FIFO command buffer (134 of FIG. 6) and the head of the FIFO command buffer (134 of FIG. 6). The contents of the FIFO command buffer head index latch 392 are multiplexed through the FIFO/clip list next address index multiplexer 394, and are stored in the FIFO/clip list next address index latch 396, and transmitted to the next address multiplexer 398, where it is indexed by the contents of the FIFO/clip list next address latch 396 to yield the memory address of the head of the FIFO command buffer which is transmitted on the physical address bus (PADRS) 272. Referring again to FIG. 6, the address is then sent to memory address and control unit 236, for transmission on the memory address bus 154. The command is returned from memory on memory data bus 152 to memory buffer 238, and the pixel SLU 214 over MEMDAT line 264. Pixel SLU 214 in turn transmits the graphics command to address generator 212 over pixel data bus (PXDAT) 222.

The use of the FIFO command buffer presents increases the efficiency of transmitting of graphics commands from the processor unit 102 to the address generator 212 in many ways. Processing the transmission of commands from processor unit 102 to address generator 212 as writes to memory allows for increases in efficiency in system operation. The use of the memory write buffers 371, 372, and 373 ensures that when commands are transmitted, that the full bandwidth of the system bus is used. Providing a FIFO command buffer 134 permits commands to be transmitted from processor unit 102 whenever the system bus is available, whether or not address generator 212 is available to process a command.

Residue Buffer

The performance of the FIFO command buffer 134 and, generally, the process by which graphics commands are sent from the processor unit 102 to the graphics processor unit 210, is made even more efficient by another feature of the invention, the residue buffer 138, in pixel SLU 214.

According to the invention, graphics commands are structured in the form of command packets of one to four 32 bit words. The first word (referred to as the "header" has two bits that designate how many 32 bit words there are in the command packet in addition to the header. For example, the length bits in a three word command packet would be set to the value two.

For the most efficient use of the memory bus, the transmissions from FIFO command buffer 134 to the graphics processor unit 210 are a uniform packet of four 32 bit words. Thus a transmission may contain parts of more than one command.

Residue buffer 138 is a set of three 32 bit registers. Residue buffer 138 is controlled by signals transmitted from the virtual translation/FIFO control unit controller 274 over FIFOCTL line 248. When a transmission from the FIFO command buffer 134 is received in the pixel SLU 214, the virtual translation/FIFO control unit controller 274 causes the first command packet to be forwarded to the address generator 212 over the pixel data bus 222. The virtual translation/FIFO control unit controller 274 causes the remainder of the transmission, which may contain additional command packets, or a portion of an additional command packet, or both, to be loaded into the residue buffer 138. When the address generator 212 has completed executing a command, the virtual translation/FIFO control unit controller 274 causes the contents of the residue buffer 138 to be immediately forwarded from residue buffer 138 to the address generator 212 over the pixel data bus 222.

The provision of residue buffer 138 ensures that the full bandwidth of memory data bus 152 is used, while still allowing for variable length of graphics command packets. In addition, storing the next command at a location close to address generator 212 decreases the idle time of address generator 212.

Short Circuit

Yet another feature of the invention that improves the performance of the FIFO command buffer 134 and, generally, the process by which graphics commands are sent from the processor unit 102 to the graphics processor unit 210, is the short circuit mechanism 382. The short circuit mechanism is logic in the virtual translation/FIFO control unit controller 274 that monitors the status of the FIFO command buffer 134, the residue buffer 138, and the address generator 212, and causes commands that are transmitted from processor unit 102 to address generator 212 to be transmitted in a minimum number of steps.

When the address generator 212 is processing a command, it asserts an AGBUSY (address generator busy) signal to short circuit mechanism 382. Additionally, the short circuit mechanism monitors the status of the residue buffer by monitoring commands issued by virtual translation/FIFO control unit controller 274. And finally, the short circuit mechanism 382 monitors the length of the FIFO command buffer 134 over FIFO length lines 404 (of FIG. 4). Each time a transaction involving the FIFO command buffer 134, the address generator 212, or the residue buffer 138, occurs, the short circuit mechanism calculates a logic equation. This equation to determines the most effective destination for the next command transmitted from processor unit 102 that is intended for the FIFO command buffer 134, that is, where should the graphics command be sent to minimize the number of transfers from one graphics command storage or processing element to another. The logic equation is summarized in the following table:

| Address Gen. Status | Residue Buffer Status | FIFO Status | Command Destination |
|---|---|---|---|
| busy | full | almost full | inhibit further transmissions |
| busy | full | not full | FIFO |
| busy | not full | empty | residue buffer |
| not busy | empty | empty | address generator |

In a preferred embodiment, FIFO command buffer 134 is not allowed to get full. Use of the "almost full" function causes the virtual translation/FIFO control unit controller 274 to inhibit further transmissions to the FIFO command buffer 134 when the "almost full" function is activated.

The FIFO command full/empty comparator 406 (of FIG. 4) compares the value stored in FIFO command buffer head index latch 392 (of FIG. 4) with the value stored in the FIFO command buffer tail index latch 386 (of FIG. 4) to calculate the length of (that is the number of commands in) FIFO command buffer 134 and compare the length with a programmable maximum, or "almost full" value, stored in FIFO length threshold mask 484. If the "almost full" value is reached, the FIFO command full/empty comparator 406 (of FIG. 4) signals the virtual translation/FIFO control unit controller 274. Virtual translation/FIFO control unit controller 274 issues an interrupt to CPU 106, to suspend the transmitting of graphics commands. As commands are transferred from FIFO command buffer 134 to address generator 212 for processing, the length of the FIFO command buffer 134 changes, thereby changing the value stored in FIFO command buffer head index latch 392 (of FIG. 4). When the length of the FIFO command buffer 134 has reached a programmable "almost empty" value, the FIFO command full/empty comparator 406 (of FIG. 4) signals the virtual translation/FIFO control unit controller 274. Virtual translation/FIFO control unit controller 274 issues an interrupt to CPU 106, to resume the transmission of graphics commands.

Short circuit logic 382 ensures that graphics commands are sent directly to the point in the command processing path as close to the address generator as possible, thereby eliminating memory transactions and also eliminating traffic on memory buses 152 and 154.

Cursor Control

Yet another feature of the invention is the method of storing cursor information in main memory 140, and the method of controlling cursor movement by graphics processor unit 210. Referring to FIG. 2, by storing cursor information in main memory 140, and controlling cursor movement in graphics processor unit 210, the invention simplifies the design of video unit 160, as well as minimizing the amount of frame buffer memory 164 that is required by the system. Additionally, some of the cursor control components can be adapted to serve as data paths for video units 160 that include devices other than frame buffer memory 164 and video DAC 166.

Figure 7:
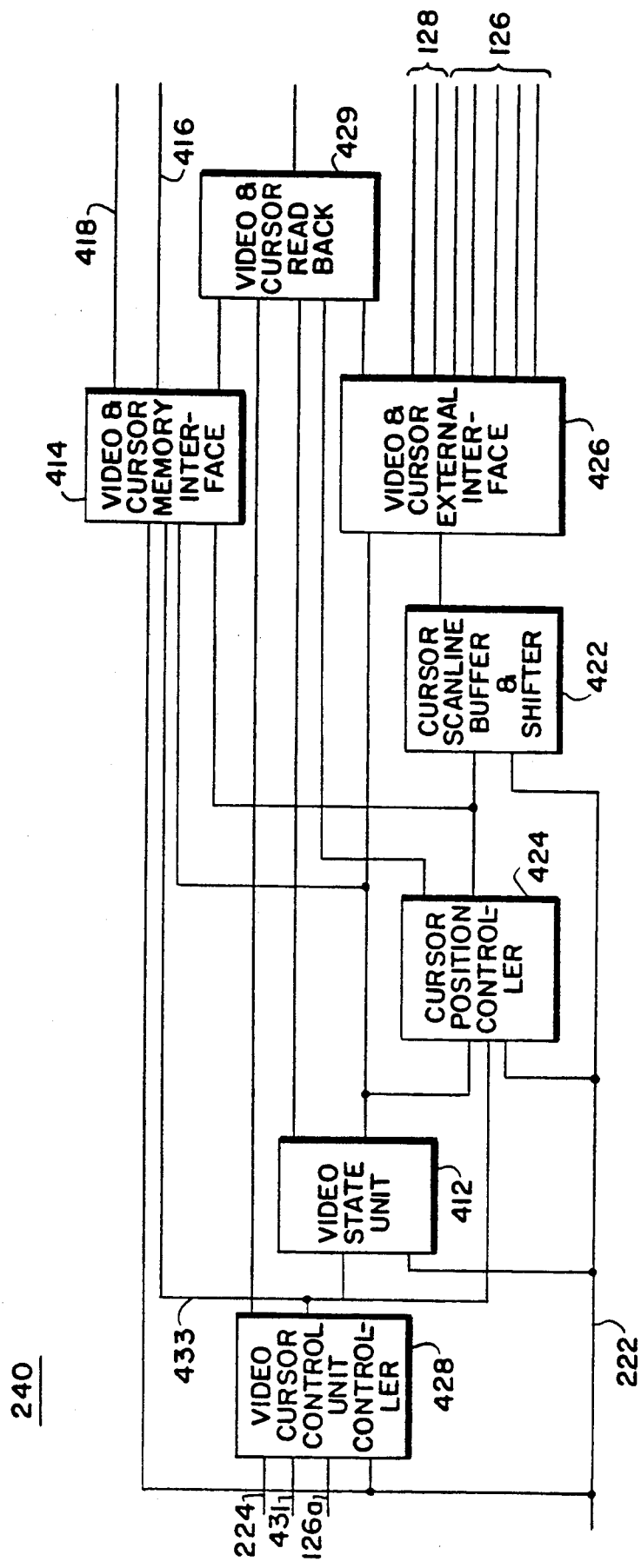
FIG. 7 is a block diagram of the video/cursor control unit.

An element in the storing and display of the cursor is video/cursor control unit 240. FIG. 7 is a block diagram of video/cursor control unit 240. Internal components of video/cursor control unit 240 are video state unit 412, cursor scanline data buffer and shifter 422, cursor position controller 424, and video/cursor control unit controller 428. Video/cursor control unit 240 transmits memory address data and memory request data through video and cursor memory interface 414 over cursor memory address line 416 and cursor memory request line 418, respectively. Additionally, video/cursor control unit 240 transmits video control information and cursor information through video and cursor external interface 426 over video control bus 126 and cursor bus 128, respectively. Video/cursor control unit controller 428 receives system clock and video clock signals, and send clock pulses to video state unit 412, cursor position controller 424, and video and cursor memory interface 414 over clock pulse lines.

Cursor information is of two forms, pattern data and screen location. Referring to FIG. 2, information regarding the cursor pattern, which extends over 64 consecutive scanlines on the display 162, is stored in a 1024 byte contiguous section of main memory 140. The address of the first byte of the 1024 byte contiguous section of main memory is stored in the video and cursor memory interface (414 of FIG. 7).

The screen location of the cursor is defined in terms of the X and Y coordinates on the display 162 of the topmost, leftmost pixel of the cursor. The X position is stated in terms of number of pixels from the leftmost side of the display 162, and the Y position is stated as the number of a scanline, beginning at the top of the display 162. The screen location of the cursor is controlled by the computer user, and is input to the computer graphics system by a cursor position controller 109, typically a "mouse", attached to bus interface 104.

Cursor screen location input from the mouse is transmitted to CPU 106. CPU 106 transmits the cursor screen location input to graphics/memory control unit 130.

Referring now to FIG. 3, the cursor screen location input enters graphics/memory control unit 130 over incoming data portion 112a of system data bus 112, and is transmitted to pixel SLU 214. Pixel SLU 214 in turn routes the cursor screen location input to the video/cursor control unit 240 over pixel data bus 222.

Referring now to FIG. 7, the cursor screen location input enters video/cursor control unit 240 over pixel data bus 222 and is routed to video state unit 412, where it is stored.

In addition to storing cursor screen location input, video state unit 412 monitors the X position (that is the number of pixels from the leftmost side of the display (162 of FIG. 2)) and Y position (that is the number of scanlines from the top of the display (162 of FIG. 2)) of next pixel to be shown on display (162 of FIG. 2). When the X and Y position of the next pixel to be shown match the screen location of the cursor, video state unit 412 signals video and cursor memory interface 414. Video and cursor memory interface 414 generates a memory read request, consisting of an address portion and a request portion. The address portion of the memory read request contains the address of the first byte of the 1024 byte contiguous section of main memory in which the cursor pattern information is stored. The address portion of the memory read request is transmitted on cursor memory address line 416. The request portion of the memory read request is transmitted on cursor memory request line 418.

Referring now to FIG. 3, the address portion of the memory read request, which was transmitted on cursor memory address line 416 is routed to memory address and control unit 236; the request portion of the memory read request, which was transmitted on cursor memory request line 418 is routed to flow control unit 232. The memory read request is then processed in the same manner as a memory request issued by address generator 212, which was described above, resulting in the cursor pattern data (for the next scanline to be displayed) being returned to pixel SLU 214. Pixel SLU 214 in turn transmits the cursor pattern data on pixel data bus 222. Video/cursor control unit 240 reads the cursor pattern data off pixel data bus 222.

Referring now to FIG. 7, cursor pattern data is routed on pixel data bus 222 to cursor scanline data buffer and shifter 422, which aligns the cursor according to signals generated by cursor position controller 424, for reasons that will be explained below. The cursor pattern data is then transmitted, by video and cursor external interface 426 over cursor bus 128 to video unit (160 of FIG. 2), where the cursor pattern data is processed in a manner that will be described in the discussion of the video unit.

Video state unit 412, subsequent to generating the signal to cursor memory interface 414, increments a scanline counter (not shown), and continues to monitor the X position of the next pixel to be shown in the display (162 of FIG. 2). When the X position of the next pixel to be shown in the display matches the X position of the cursor, video state unit 412 examines the value in the scanline counter. If the value in the counter is less than 64 (meaning that there are more scanlines of cursor to be displayed), video state unit 412 issues a signal to cursor memory interface 414, which requests the next scanline of cursor information from main memory (140 of FIG. 2). If the value in the scanline counter is 64, then cursor has been displayed, and the video state unit 412 takes no further action relative to cursor display, until the next time the X and Y position of the cursor matches the X and Y position of the next pixel to be shown.

The alignment signals generated by cursor position controller 424 are necessary because transmissions on cursor bus include groups of pixels. If the first pixel of the cursor pattern is in the middle of the group of pixels, it is necessary to properly align the first pixel of cursor pattern data with the group of pixels in the transmission.

Video/cursor control unit controller 428 receives control information from flow control state unit 232 over FCTL line 224, and receives timing signals from system clock line 431 and video clocks (which will be described later in the description of video unit 160), over incoming portion of video control bus 126a.

An additional function of video/cursor control unit controller 428 is to control the configuration of the other elements of video/cursor control unit 240. If it is desired to replace video unit 160 with a more complex video unit, such a three dimensional graphics processor unit, or a more sophisticated video DAC, the invention provides for using some of the communications links and memory request capabilities of video/cursor control unit 240 for purposes other than cursor control. A signal (not shown), is generated by CPU 106 to video/cursor control unit controller 428 causes a change in a bit in a register in video/cursor control unit controller 428, which causes video/cursor control unit controller 428 to disable the logic in other elements of the video/cursor control unit. Instead, signals passes directly between cursor bus 126 to flow control unit (232 of FIG. 3) over VRREQ line 416. This will be described in more detail in the discussion below of the video unit 160 and the memory bus structure 150.

Thus it can be seen that by placing the cursor and video control functions in graphics processor unit 210, the invention allows cursor pattern information to be stored in main memory 140, and further allows video unit 160 to require less logic and less frame buffer memory than would otherwise be required.

Frame Buffer Module

Another feature of the invention is the arrangement of system elements so that the circuit board, or module, on which the frame buffer memory 164 is placed contains a minimum of circuitry and components, and is therefore less expensive. If the computer user wishes to upgrade the monitor from, for example, a low resolution monitor to a high resolution monitor, or from a monochrome monitor to a color monitor, the computer user must typically add more frame buffer memory. This generally requires replacing the frame buffer module. Since, according to the invention, the frame buffer module contains a minimum of circuitry and components, the frame buffer module is relatively inexpensive, thus minimizing the cost to the user.

Figure 8A:
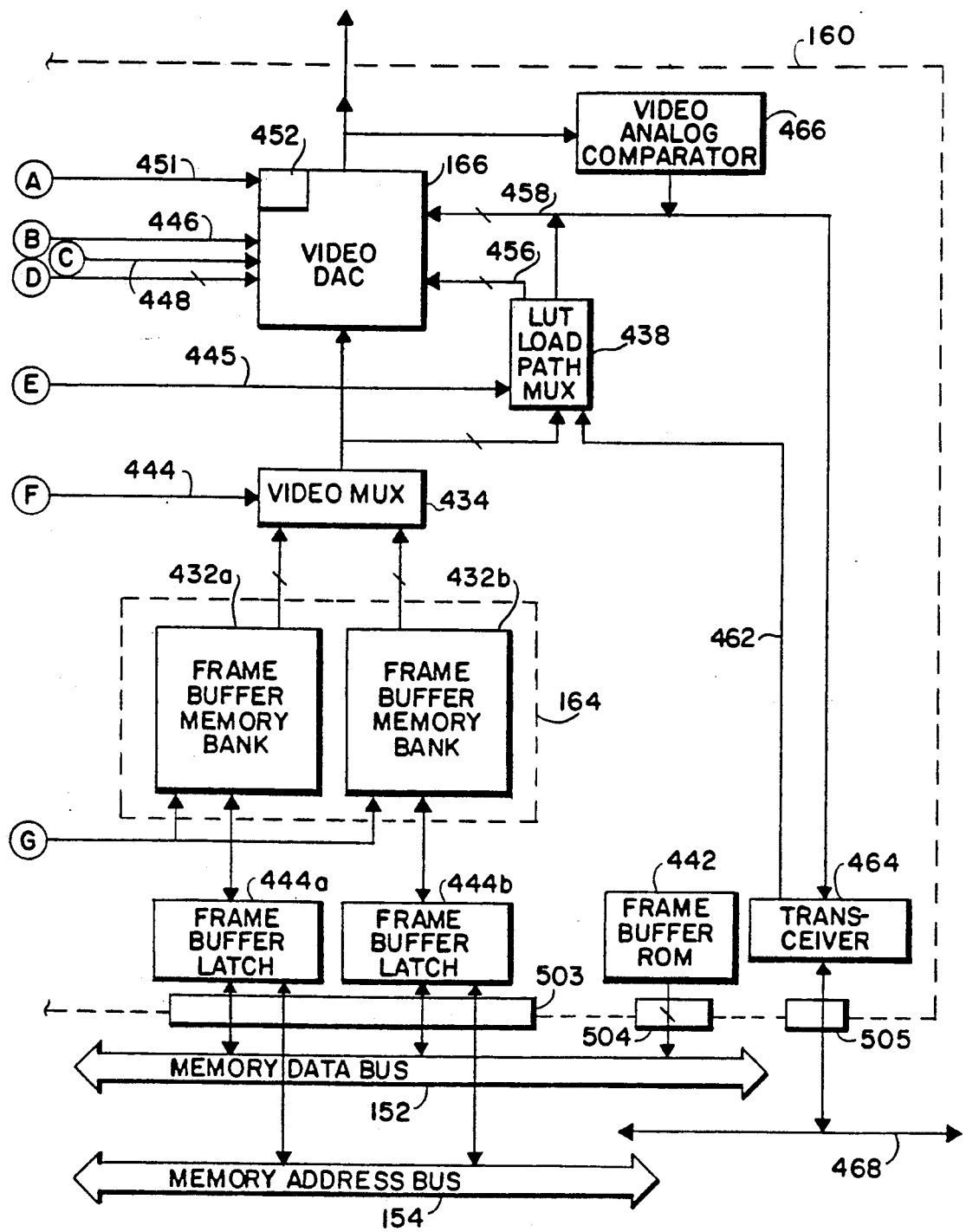
FIGS. 8Aa and 8Ab are a block diagram of the video unit and the memory bus structure, the cursor bus, and the video control bus.
Figure 8A:
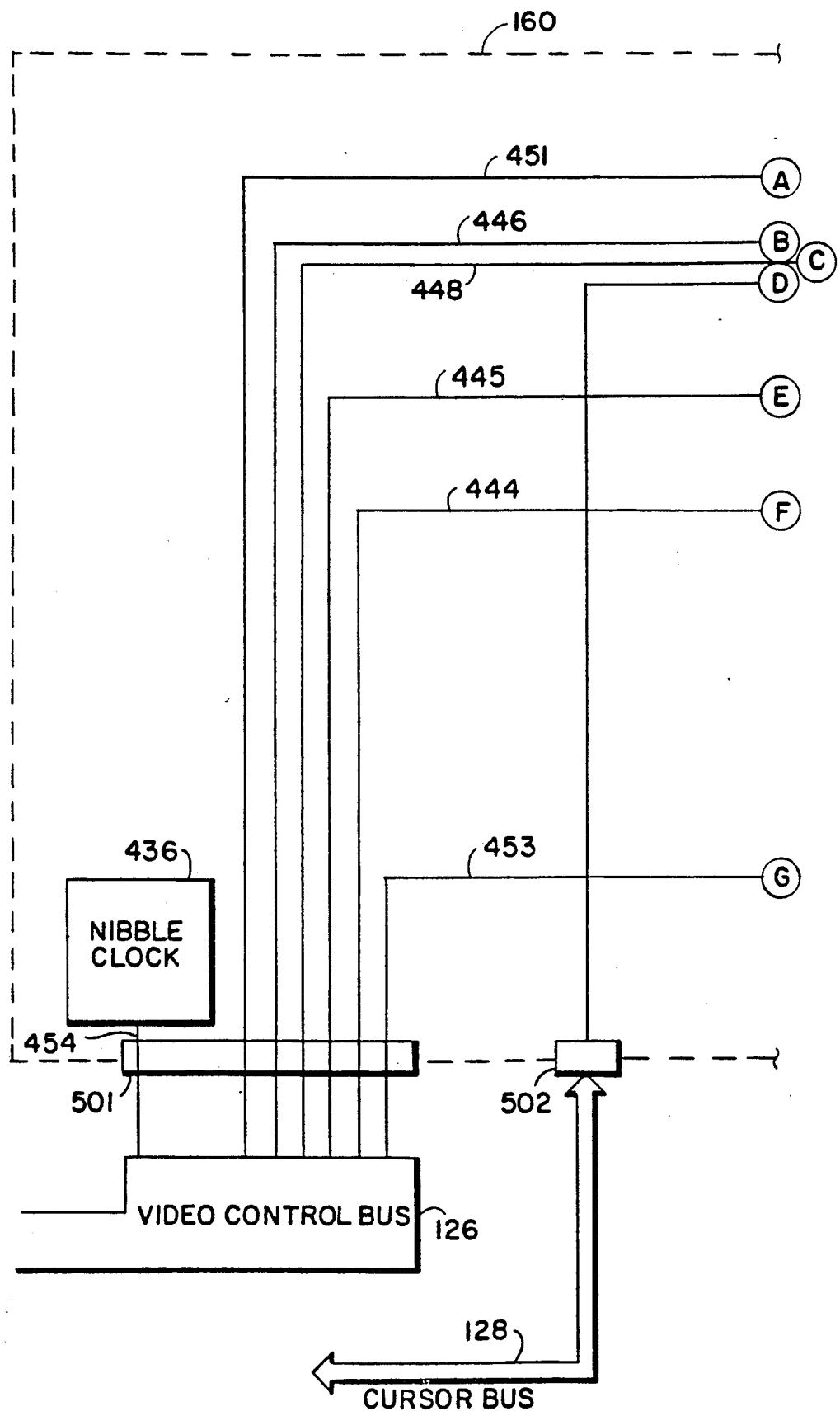
Figure 8B:
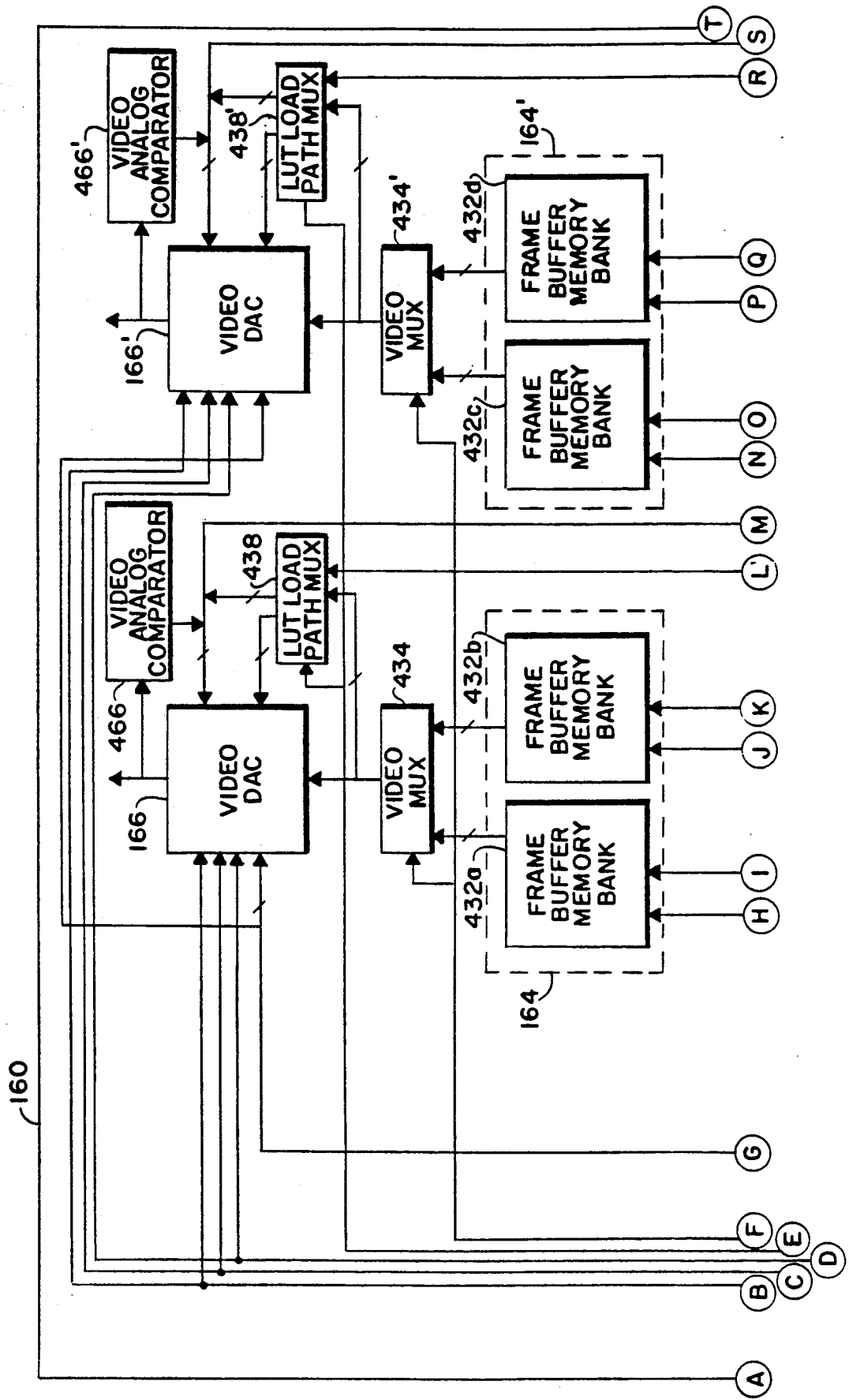
FIGS. 8Ba and 8Bb are a block diagram of the video unit and the memory bus structure, with the video unit configured to provide output to two displays.
Figure 8B:
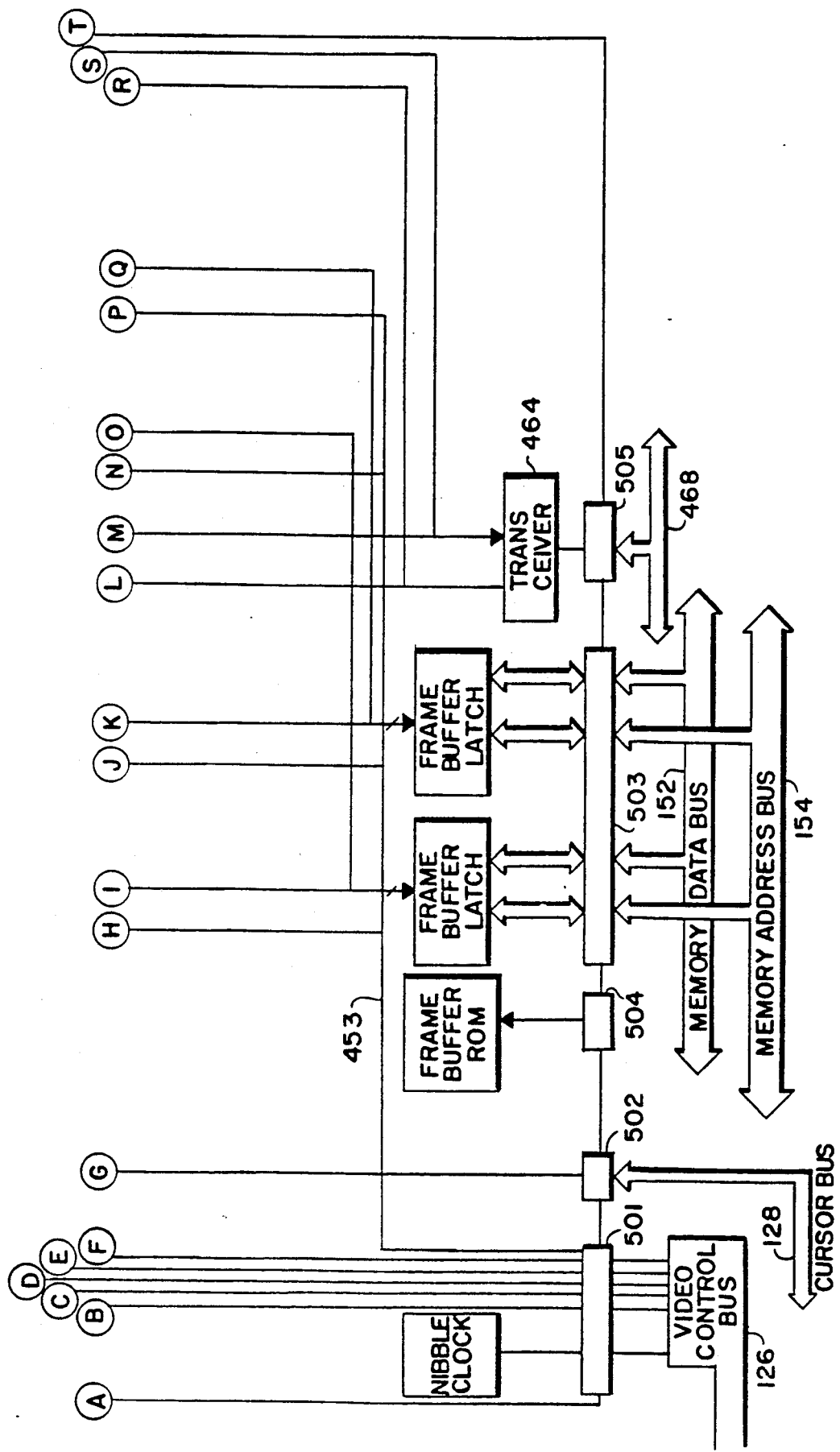

Several of the elements of the frame buffer module are contained in video unit 160. FIG. 8a shows video unit 160 in greater detail, in a configuration designed to support a low resolution monitor. Frame buffer memory 164 consists of interleaved frame buffer memory banks 432a and 432b, each bank being four 128K eight bit units of standard dual ported video RAM. Frame buffer memory banks 432a and 432b are connected to video DAC 164 (for example, a model BT458 RAMDAC, available from the Brooktree Corporation of San Diego, Calif. is suitable) through video multiplexer 434. Also present on video unit 160 are nibble clock 436, LUT load path multiplexer 438 (connected to video multiplexer 434 and video DAC 164), and frame buffer ROM 442. It can be noted that these elements are either available commercially (frame buffer memory banks 432a and 432b, and video DAC 164) or are relatively simple components (multiplexers 434 and 438, ROM 442, nibble clock 436 and latches 444a and 444b referenced below). There is no timing or video control logic (typically custom designed for the computer system, and therefore relatively expensive), on video unit 160. Video unit 160 is implemented as a module, that is the components of video unit 160 are mounted on an easily replaceable unit, such as a circuit board.

Components of video unit 160 are connected to a plurality of buses and communication lines through ports 501-505. Frame buffer memory banks 432a and 432b are connected to memory data bus 152 and memory address bus 154 through frame buffer latches 444a and 444b. Cursor bus 128 is connected to video DAC 166. Timing bus 126 carries a variety of timing signals for various components of video unit 160. Video synchronization (VSYNC) line 446 and video blanking (VBLNK) line 448 connect to video DAC 166, and video DAC enable (BTEN) line attaches to video DAC timing unit 452. There are two multiplexer select lines, a first line 444 which connects to and controls video multiplexer 434, and a second line which connects to and controls LUT load path multiplexer 438. Video shift line 453 connects to frame buffer memory banks 432a and 432b, and nibble clock (NIBCLK) line 454 connects to nibble clock 436.

Data is communicated between frame buffer memory banks 432a and 432b over memory data bus 152 according to signals transmitted on memory address bus 154. Frame buffer latches 444a and 444b act as temporary storage that allow memory data banks 432a and 432b, which transmit data in 64 bit units, to interface with memory data bus 152, which transmits data in 32 bit units.

Data is communicated between frame buffer memory banks 432a and 432b to video DAC 164 through video multiplexer 434. Memory banks 432a and 432b are "interleaved"; according to interleaved memory operation, video multiplexer 354 selects data alternately from memory banks 432a and 432b, and reads the data into video DAC 164. Video DAC 164 converts data to video signals for display 162. Data from memory banks 352 and 354 may be overwritten by input from cursor bus 128, which superimposes the cursor over the graphics image, or by VBLNK line 364, which causes screen of display 162 to be blanked.

If video display 162 is a color or gray scale monitor, a color look up table (LUT) is stored in either or both of frame buffer memory banks 352a and 352b. Each entry in the LUT contains a combination of the colors (typically red, blue, and green) that the display 162 can illuminate, with varying degrees of intensity, at each pixel. Each entry in frame buffer memory banks 432a and 432b contain a reference to an entry in the LUT. The LUT is loaded into video DAC 164 through video multiplexer 434 and the LUT load path multiplexer 438. The LUT load path multiplexer separates the output from video multiplexer into two portions, a data portion and a control portion. The control portion is transmitted to video DAC over LUT control input line 456, and the data portion is transmitted to video DAC over LUT control data line 458. The LUT load path multiplexer also selects between LUT input from video multiplexer 434 and from diagnostic signal line 462. Transceiver 464, video analog comparator 466, and diagnostic signal bus 468 are a part of the diagnostic system.

If display 162 is a high resolution monitor, the video unit 160 required is the same as that of FIG. 8a, except frame buffer memory banks 432a and 432b are each 8 256K four bit units of standard dual ported video RAM. Elements common to the implementation of video unit 160 necessary to support a high resolution monitor and the implementation of video unit 160 necessary to support a low resolution monitor are relatively simple, standard items.

FIG. 8a shows video unit 160 in a configuration designed to support a multiple headed system, that is a system that has two displays. Additional elements required to support the second display include additional frame buffer 164′, which includes memory banks 432c and 432d, video multiplexer 434′, LUT load path multiplexer 438′, and video analog comparator 466′, and video DAC 166′. Signal lines from timing bus 126 and cursor bus 128 are split and connected to the corresponding additional elements.

Thus upgrading to a different monitor is accomplished with little additional cost, other than the additional cost of the monitor. In addition, implementing video unit 160 as a module, connected to buses 126, 128, 152, 154, and 468, by ports 501-505 enables the upgrade to be accomplished by removing module 160 from ports 501-505 and replacing it with another module 160′ (not shown in this Figure).

Cursor Bus

Figure 9:
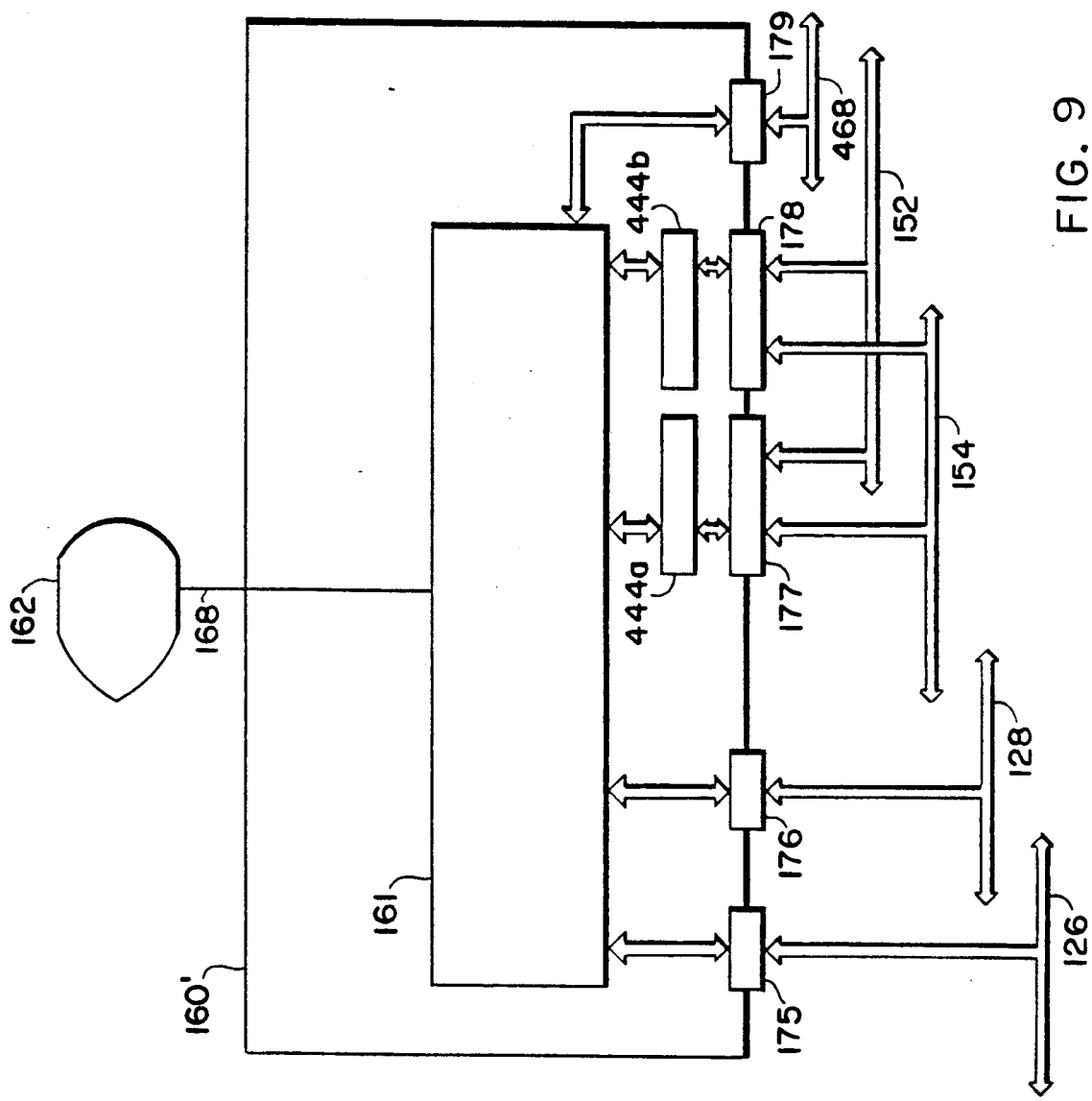
FIG. 9 is a block diagram of FIG. 8a, with the video unit replaced by an optional device.

Another feature of the invention is the method by which the cursor bus 128 can be adapted for uses other than transmitting cursor information. FIG. 9 shows the structure of FIG. 8, with video unit 160 replaced by a video unit 160′, which has on it video device 161. Video device 161 may be a video option, such as a three dimensional video device or a graphic accelerator. Video device 161 may also be any other type of computer device which can advantageously be attached to the memory bus. Video unit 160′ is connected to memory data bus 152 and memory address bus 154, thereby allowing for memory transfers between video unit 160′ and main memory (140 of FIG. 2) in the same manner as described previously for transfers between frame buffer memory (164 of FIG. 2) and main memory (140 of FIG. 2). In addition, video unit 160′ is connected to cursor bus 128. As will be more fully described later in the discussion of the video cursor bus, cursor bus 128 can be used to transmit signals, such as inhibit, reset, and interrupt signals.

Figure 10:
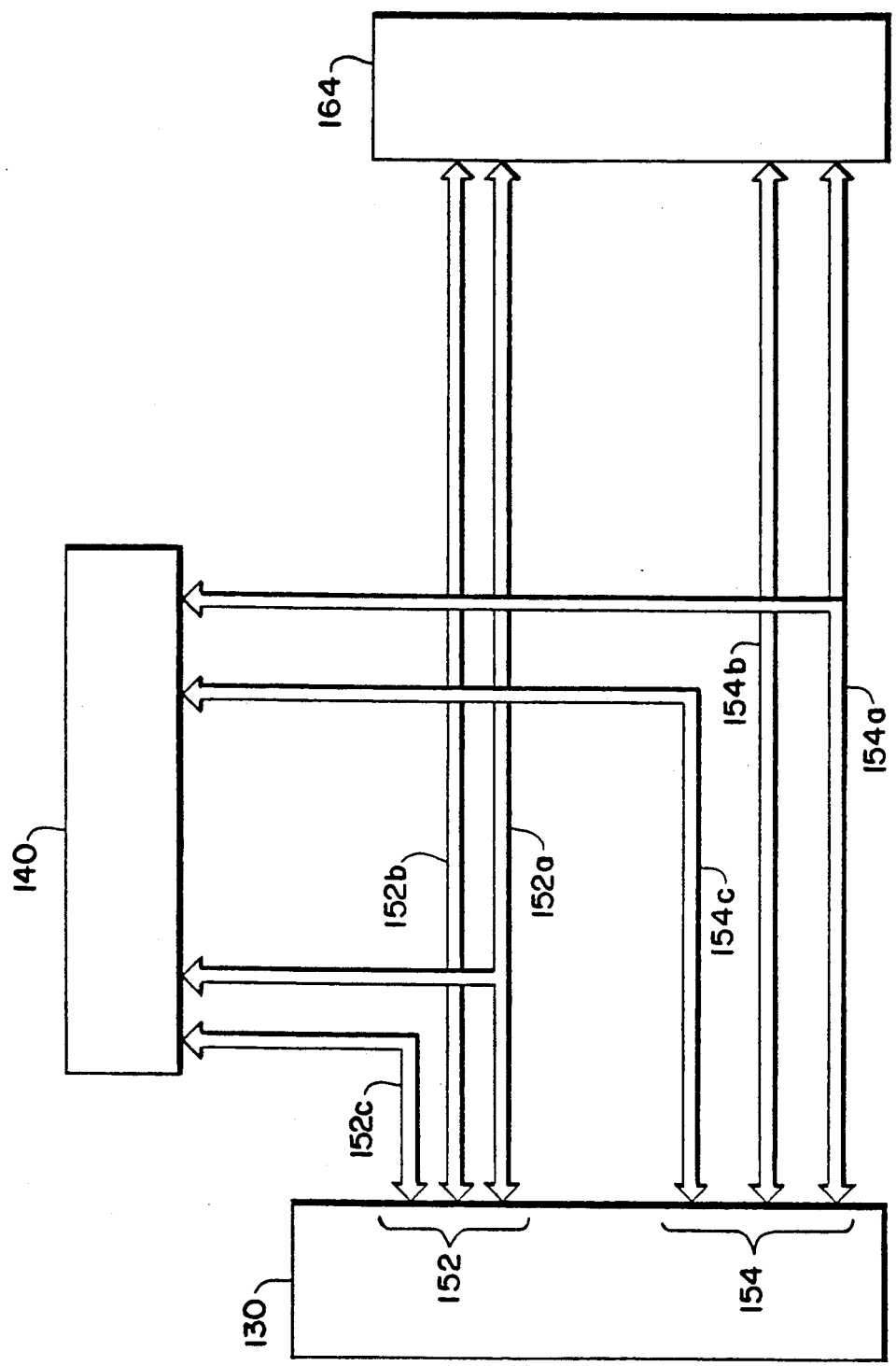
FIG. 10 is a block diagram of the memory bus structure.

The memory bus structure 150 is especially adapted to efficiently transfer data between frame buffer memory 164 and to other system components connected to memory bus structure 150. Memory bus structure 150, consisting of memory data bus 152, memory control bus 154, video control bus 126, and cursor bus 128 is implemented as a set of communication lines from memory control unit 220 to main memory 140, frame buffer memory 164, and video DAC 166. Memory bus structure 150 is shown in FIG. 10.

Memory data bus 152 consists of three portions. First portion 152a of memory data bus 152 connects to both main memory 140 and to frame buffer memory 164. First portion 152a transmits data, and latch enable signals that allow memory bus to be of a different width, in number of bits, from main memory 140 or frame buffer 164. Thus, data can be transmitted over memory data bus 152 first portion 152a to either main memory 140 or frame buffer memory 164. Second portion 152b of memory data bus 152 consists of three communications lines that connect memory control unit 220 and frame buffer memory 164. The three communications lines of second portion of memory data bus 152b are output enable lines for frame buffer memory 164. Third portion 152c of memory data bus 152 consists of communication lines that connect memory control unit 220 and main memory 140.

Memory address bus 154 consists of three portions. First portion 154a of memory address bus 154 consists of communications that connect graphics/memory unit 130 with both main memory 140 and frame buffer memory 164, thereby enabling address data to be transmitted from memory control unit 220 to both main memory 140 and frame buffer memory 164. Second portion 154b of memory address bus 154 consists of three communication lines that terminate at memory control unit 220 and frame buffer memory 164. The three communication lines transmit timing signals, output enable signals, and special function information, respectively. Third portion 154c of memory address bus 154 connects memory control unit 220 and main memory 140.

The cursor bus 128 consists of communications lines that transmit cursor information to video DAC 166.

Eight communications lines can also be used for other purposes if the video unit 160 is replaced (as shown in FIG. 8) with a video unit 160', which has on in it a video device 161 such as more complex video unit, a three dimensional graphics unit, or a more sophisticated video DAC. In this case, the eight communication lines do not carry cursor signals. Instead, two of the lines carry system clock signals to the video unit 160'; two of the lines carry signals to video unit 160' indicating the validity and length, in 32 bit words, of transmissions intended for video device 161, one of the lines transmits reset signals to video device 161, and the remaining three lines carry inhibit, interrupt, and stall signals from the video unit 160'.

Referring now to FIG. 7, it was described above that if video unit 160 is replaced by a optional device (160' of FIG. 9), a signal, generated by CPU (106 of FIG. 2) to video/cursor control unit controller 428 changes a bit in a register in video/cursor control unit controller 428, which causes cursor scanline data buffer and shifter 422 not to perform its normal function. Instead, cursor scanline data buffer and shifter 422 passes data between cursor bus 126 and pixel data bus 222. This configuration provides a direct communication path between cursor bus 126 and cursor memory interface 414, thus enabling the video unit (160' of FIG. 9) to communicate control signals through cursor memory interface 414.

This configuration further provides a method for accomplishing memory transfers directly between main memory 140 and video unit 160' without moving the data through graphics/memory unit 130. Graphics processor unit 210 issues a memory read request in the manner described above. The read request results in the data from the requested memory address to be transmitted on memory data bus 152. Signals are transmitted on the two lines of cursor bus 128 that indicate the validity and length of transmissions intended for video device 161, thereby causing one of latches 444a and 444b to read the data that is on cursor bus 128.

Video control bus 126 transmits video control signals to video unit 160'. Video control bus 126 consists of a plurality of communications lines. Eight of the communications lines transmit, respectively, a video blanking signal, a video synchronization signal, a video shift register enable signal, a video multiplexer select signal, an enable signal for loading the color look-up table (LUT), an LUT input multiplexer select signal, and a video nibble clock signal.

Thus, the invention provides a method by which the cursor bus 128 can be used for purposes other than communicating cursor information. This enables the system designer to replace the video module (160 of FIG. 2) with a video unit 160', without requiring the expensive and complex task of redesigning the memory bus structure 150. The graphics system can therefore be easily and inexpensively upgraded from a low resolution monitor, to a higher resolution monitor, to a more complex video option, or to some other optional device. In addition, the invention allows for the transfer of data directly from main memory 140 to video unit 160', without the data passing through graphics/memory unit 130.

The invention having been thus described, it will be apparent to those skilled in the art that the invention may be practiced in ways other than as specifically described, while remaining within the spirit and scope of the appended claims.

We claim:

1. A computer graphics system, comprising
   a CPU for generating graphics commands of variable length, each of said graphics commands having a first indicator for marking a beginning of said graphics command and a second indicator for denoting the length of said graphics command;
   a graphics processor for processing said graphics commands;
   means for transmitting a transmission unit having a predetermined fixed length from said CPU to the graphics processor, said transmission unit containing at least a portion of one of said graphics commands;
   means for storing said portion of a graphics command;
   means, associated with said graphics processor for receiving said transmission unit and for determining if said transmission unit contains a complete graphics command;
   means, responsive to said receiving and determining means, for routing said complete graphics command to said graphics processor; and
   means for combining portions of subsequently transmitted transmission units with said stored portion of said transmission unit to form a complete graphics command.

2. The computer system as claimed in claim 1 wherein
   said transmission unit contains a plurality of graphics commands,
   said receiving and determining means detects said first indicator and said second indicator of a first one of said plurality of graphics commands to determine the part of said transmission unit containing said first one graphics command;
   said routing means routes said first one graphics command to said graphics processor; and
   said directing means directs the others of said plurality of graphics commands to said storing means.

3. The computer system as claimed in claim 2, further comprising
   means, for monitoring said graphics processor for its availability to process a graphics command; and
   means, responsive to said monitoring means, for sending another of said plurality of graphics commands to the graphics processor.

4. The computer system as claimed in claim 3, wherein said transmitting means comprises
   a second of a main memory for storing said graphics commands; and
   means for assembling said graphics commands from said section of main memory into said transmission units.

5. The computer system as claimed in claim 4, further comprising a frame buffer memory, connected to said bus, for storing data for display on a video device, wherein the processing of the graphics commands by the graphics processor overwrites said data stored in said frame buffer memory.

6. The computer graphics system as claimed in claim 1 further comprising
   first determining means for determining if said graphics processor is available to process a graphics command;
   second determining means for determining if said storage means contains a complete graphics command; and means, responsive to said first and second determining means for sending said complete graphics command to said graphics processor.

7. The computer system as claimed in claim 1 wherein said transmitting means comprises
   a section of main memory, for storing said graphics commands; and
   means for assembling said graphics commands from said section of main memory, into said transmission units.

8. The computer system as claimed in claim 1 further comprising a frame buffer memory connected to said bus for storing data for display on a video device, wherein the processing of the graphics commands by the graphics processor overwrites said data stored in said frame buffer memory.

9. A computer graphics system, comprising:
   a CPU for issuing graphics commands to a graphics processor, the graphics commands having a variable length, each graphics command having a first indicator for marking a beginning of said graphics command and a second indicator for denoting the length of said graphics command;
   means for transmitting said graphics commands from said CPU to a main memory, said main memory having a portion for temporarily storing graphics commands issued by said CPU;
   means for transmitting said graphics commands from said main memory to said graphics processor in transmission units, said transmission units having a fixed predetermined length and containing a first graphics command and a portion of a second graphics command;
   means for separating the first graphics command from said portion of a second graphics command;
   means for routing the separated first graphics command to said graphics processor;
   means for storing said portion of said second graphics command; and
   means for combining subsequently transmitted portions of graphics commands with said stored portion of said second graphics command to form a complete graphics command.

10. The computer graphic system as claimed in claim 9 wherein said transmission unit contains a plurality of graphics commands, and wherein
   said separating means separates the first of the plurality of graphics commands from the remainder of the plurality of graphics commands;
   said routing means routes the first of the plurality of graphics commands to said graphics processor; and
   said storing means stores the remainder of said plurality of graphics commands.

* * * * *